US012689722B2

(12) United States Patent
Urban et al.

(10) Patent No.: US 12,689,722 B2
(45) Date of Patent: Jul. 21, 2026

(54) ILLUMINATION COMPENSATION FOR VIDEO ENCODING AND DECODING

(71) Applicant: InterDigital VC Holdings, Inc., Wilmington, DE (US)

(72) Inventors: Fabrice Urban, Thorigne Fouillard (FR); Antoine Robert, Mézières sur Couesnon (FR); Philippe Bordes, Laille (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 466 days.

(21) Appl. No.: 17/617,449

(22) PCT Filed: Jun. 9, 2020

(86) PCT No.: PCT/US2020/036783
§ 371 (c)(1),
(2) Date: Dec. 8, 2021

(87) PCT Pub. No.: WO2020/251930
PCT Pub. Date: Dec. 17, 2020

(65) Prior Publication Data
US 2022/0303526 A1     Sep. 22, 2022

(30) Foreign Application Priority Data

Jun. 12, 2019    (EP) ..................................... 19305746

(51) Int. Cl.
| | |
|---|---|
| *H04N 19/139* | (2014.01) |
| *H04N 19/105* | (2014.01) |
| *H04N 19/137* | (2014.01) |
| *H04N 19/159* | (2014.01) |
| *H04N 19/176* | (2014.01) |

(52) U.S. Cl.
CPC ......... *H04N 19/105* (2014.11); *H04N 19/137* (2014.11); *H04N 19/159* (2014.11); *H04N 19/176* (2014.11)

(58) Field of Classification Search
CPC .. H04N 19/105; H04N 19/137; H04N 19/159; H04N 19/176
See application file for complete search history.

(56) References Cited

U.S. PATENT DOCUMENTS

| | | |
|---|---|---|
| 2009/0034854 A1 | 2/2009 | Lee et al. |
| 2015/0023422 A1 | 1/2015 | Zhang et al. |

(Continued)

FOREIGN PATENT DOCUMENTS

| | | |
|---|---|---|
| CN | 101766030 A | 6/2010 |
| CN | 105379288 A | 3/2016 |

(Continued)

OTHER PUBLICATIONS

Filippov et al, "CE1-related: Simplified and robust LIC parameter derivation unified with CCLM", Joint Video Experts Team (JVET) of ITU-T SG 16 WP 3 and ISO/IEC JTC 1/SC 29/WG 11, Document: JVET-N0716_v3, 14th Meeting: Geneva, Switzerland, Mar. 19, 2019, 8 pages.

(Continued)

*Primary Examiner* — Patrick E Demosky
(74) *Attorney, Agent, or Firm* — Condo Roccia Koptiw LLP

(57) ABSTRACT

A video codec can involve determining a motion compensation mode associated with encoding a first block of picture information, the motion compensation mode including a sub-block based motion compensation prediction mode or a non-rectangular block partition mode; determining that a second block of picture information spatially neighboring the first block was encoded or decoded based on an illumination compensation; and encoding or decoding the first block based on the motion compensation mode and the illumination compensation.

23 Claims, 16 Drawing Sheets

(56) References Cited

U.S. PATENT DOCUMENTS

| | | | | |
|---|---|---|---|---|
| 2016/0366415 A1 | 12/2016 | Liu et al. | | |
| 2018/0098086 A1 | 4/2018 | Chuang et al. | | |
| 2019/0260996 A1* | 8/2019 | Zhang | ................ | H04N 19/573 |
| 2019/0320203 A1* | 10/2019 | Chiang | ............... | H04N 19/157 |
| 2020/0213600 A1* | 7/2020 | Seregin | ............... | H04N 19/186 |
| 2020/0236390 A1* | 7/2020 | Galpin | ................ | H04N 19/463 |
| 2022/0060741 A1 | 2/2022 | Aono et al. | | |

FOREIGN PATENT DOCUMENTS

| | | | | |
|---|---|---|---|---|
| CN | 107710764 A | 2/2018 | | |
| EP | 3468193 A1 | 4/2019 | | |
| EP | 3468194 A1 | 4/2019 | | |
| WO | 2018/127188 A1 | 7/2018 | | |
| WO | 2019/004283 A1 | 1/2019 | | |
| WO | 2019/006363 A1 | 1/2019 | | |
| WO | WO-2020050283 A1 * | 3/2020 | .......... | H04N 19/105 |
| WO | WO 2020118211 A2 | 6/2020 | | |

OTHER PUBLICATIONS

Chen et al., "Algorithm description for Versatile Video Coding and Test Model 4 (VTM 4)", Joint Video Experts Team (JVET) of ITU-T SG 16 WP 3 and ISO/IEC JTC 1/SC 29/WG 11; Doc JVET-M1002-v1; 13th Meeting: Marrakech, Morrocco, Jan. 9, 2019, 60 pages.

Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, Document JVET-G1001-v1; 7th Meeting: Torino, Italy, Jul. 13, 2017, 48 pages.

Anonymous, "High Efficiency Video Coding", International Telecommunications Union (ITU), Series H: Audiovisual and Multimedia Systems Infrastructure of audiovisual services—Coding of moving video, International Telecommunications Union Standardization Sector, Recommendation ITU-T H.265, Oct. 2014, 540 pages.

Yang et al, "Description of Core Experiment 4 (CE4): Inter prediction", Joint Video Experts Team (JVET) of ITU-T SG 16 WP3 and ISO/IEC JTC 1/SC 29/WG 11, 14th Meeting: Geneva, Switzerland, Mar. 19, 2019, 11 pages.

Grecos, Christos, "Beyond the High Efficiency Video Coding Standard: An Overview", The International Society for Optics and Photonics (SPIE), Real-Time Image and Video Processing 2017, Proceedings of SPIE, vol. 102230F, May 1, 2017, 18 pages.

Tsai, Ming C., "CE10-related: Simplification of Local Illumination Compensation", JVET-M0182, Joint Video Experts Team (JVET) of ITU-T SG 16 WP 3 and ISO/IEC JTC 1/SC 29/WG 11 13th Meeting: Marrakech, MA, Jan. 9-18, 2019.

* cited by examiner

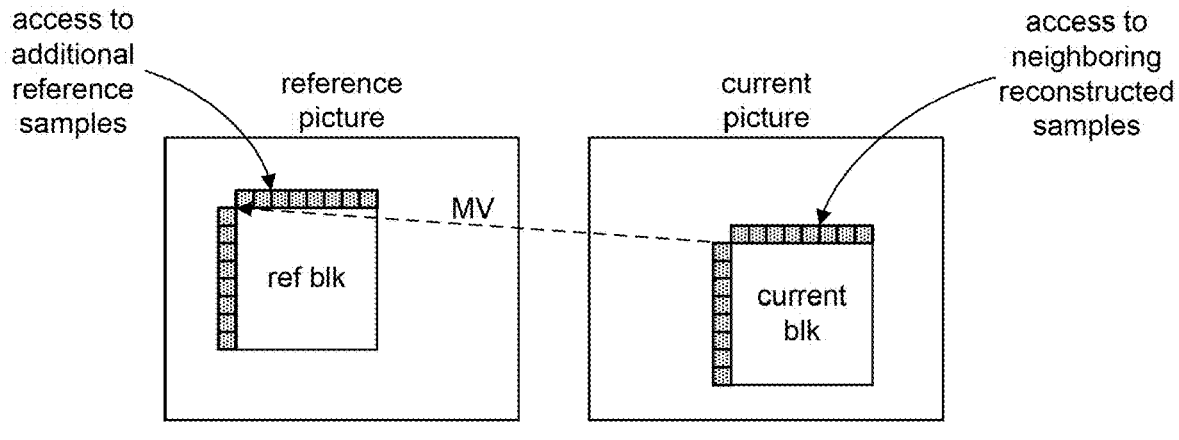
FIG. 5A
FIG. 5B
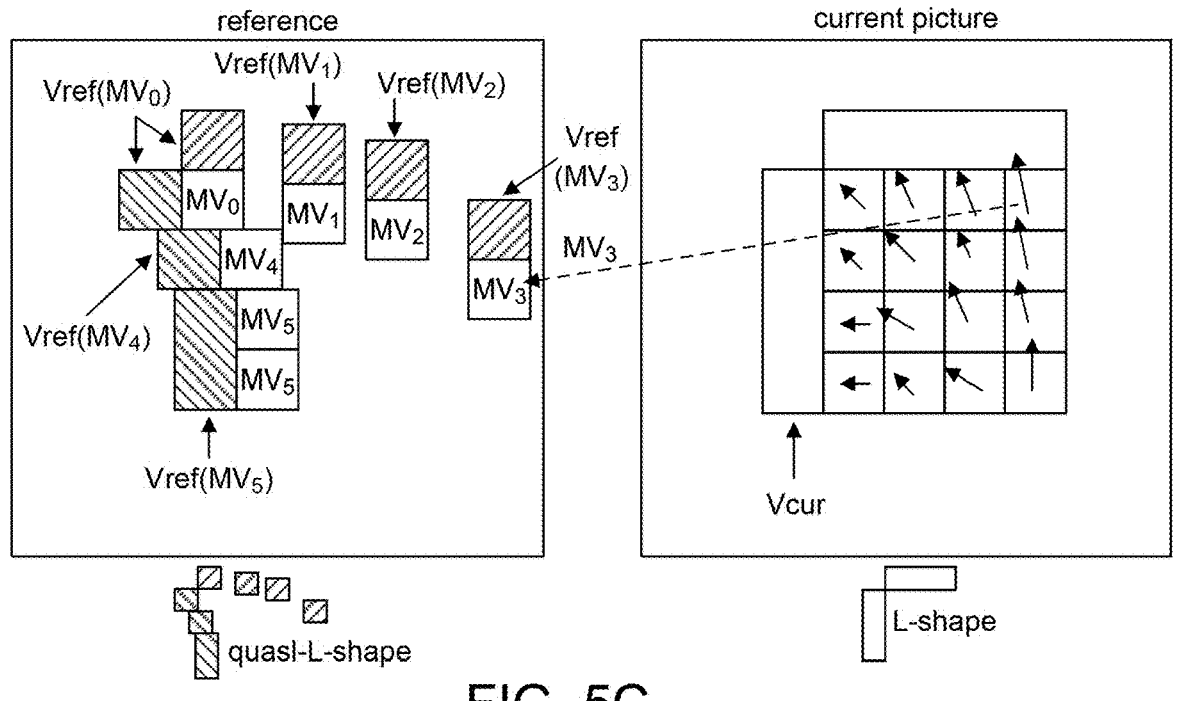
FIG. 5C $$\frac{2}{8}\times P_1 + \frac{6}{8}\times P_2$$

$$\frac{4}{8}\times P_1 + \frac{4}{8}\times P_2 \qquad \frac{7}{8}\times P_1 + \frac{1}{8}\times P_2$$

weighting factor for
the luminance samples weighting factor for the
chrominance samples

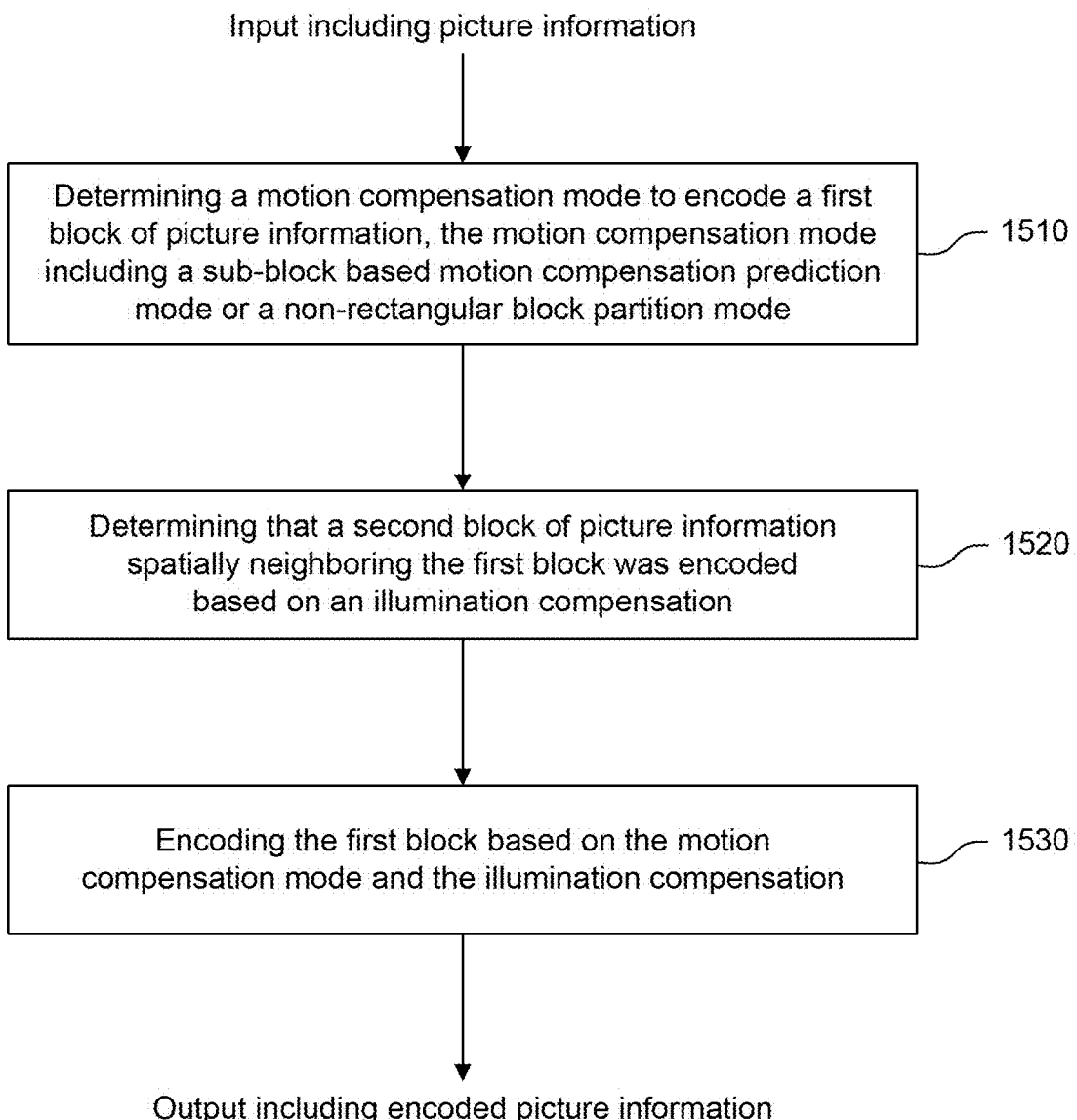

Input including picture information

Determining a motion compensation mode to encode a first block of picture information, the motion compensation mode including a sub-block based motion compensation prediction mode or a non-rectangular block partition mode — 1510

Determining that a second block of picture information spatially neighboring the first block was encoded based on an illumination compensation — 1520

Encoding the first block based on the motion compensation mode and the illumination compensation — 1530

Output including encoded picture information

FIG. 15

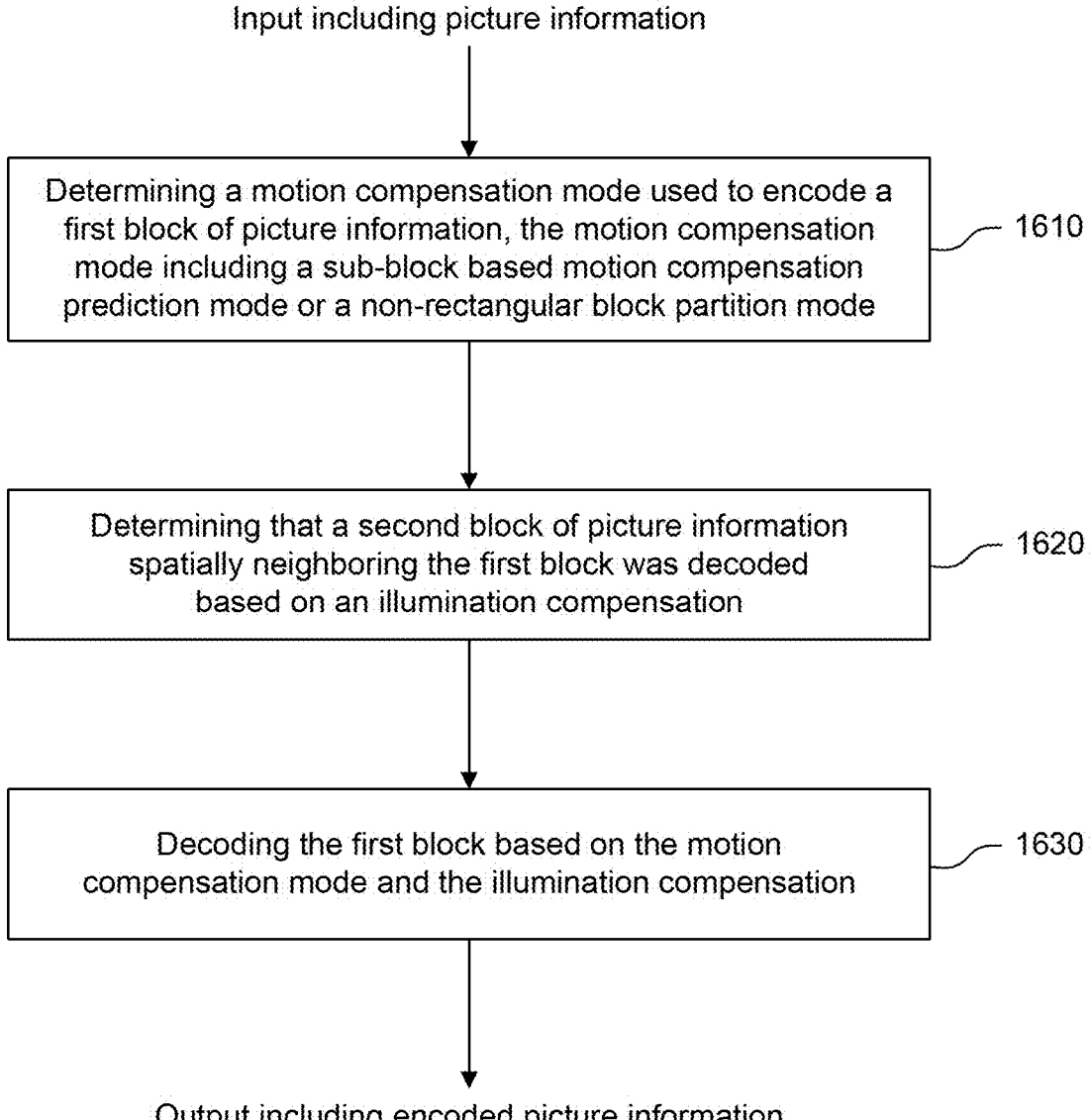

Input including picture information

Determining a motion compensation mode used to encode a
first block of picture information, the motion compensation
mode including a sub-block based motion compensation
prediction mode or a non-rectangular block partition mode        1610

Determining that a second block of picture information
spatially neighboring the first block was decoded
based on an illumination compensation        1620

Decoding the first block based on the motion
compensation mode and the illumination compensation        1630

Output including encoded picture information

FIG. 16

ILLUMINATION COMPENSATION FOR VIDEO ENCODING AND DECODING

CROSS REFERENCE TO RELATED APPLICATIONS

This application is a U.S. National Stage Application under 35 U.S.C. 371 of International Patent Application No. PCT/US2020/036783, filed Jun. 9, 2020, which is incorporated herein by reference in its entirety.

This application claims the benefit of European Patent Application No. 19305746.0, filed Jun. 12, 2019, which is incorporated herein by reference in its entirety.

TECHNICAL FIELD

The present disclosure involves video encoding and decoding.

BACKGROUND

To achieve high compression efficiency, image and video coding schemes such as that defined by the HEVC (High Efficiency Video Coding) standard usually employ predictive and transform coding to leverage spatial and temporal redundancy in the video content. Generally, intra or inter prediction is used to exploit the intra or inter frame correlation, then the differences between the original blocks and the predicted blocks, often denoted as prediction errors or prediction residuals, are transformed, quantized, and entropy coded. To reconstruct the video, the compressed data is decoded by inverse processes corresponding to the prediction, transform, quantization, and entropy coding. Recent additions to video compression technology include various versions of the reference software designated Versatile Video Coding (VVC) and/or documentation of the Joint Exploration Model (JEM) being developed by the Joint Video Exploration Team (JVET). An aim of efforts such as JEM is to make further improvements to existing standards such as HEVC. One area of improvement can involve the suite of tools available for video compression. For example, a proposed Local Illumination Compensation (LIC) tool can provide a compensation during encoding and decoding for adverse effects that might be introduced by illumination changes.

SUMMARY

In general, an example of an embodiment can involve a method comprising determining a motion compensation mode used to encode a first block of picture information, the motion compensation mode including a sub-block based motion compensation prediction mode or a non-rectangular block partition mode; determining that a second block of picture information spatially neighboring the first block was decoded based on an illumination compensation; and decoding the first block based on the motion compensation mode and the illumination compensation.

In general, another example of an embodiment can involve a method comprising: determining a motion compensation mode to encode a first block of picture information, the motion compensation mode including a sub-block based motion compensation prediction mode or a non-rectangular block partition mode; determining that a second block of picture information spatially neighboring the first block was encoded based on an illumination compensation;

and encoding the first block based on the motion compensation mode and the illumination compensation.

In general, another example of an embodiment can involve apparatus comprising one or more processors configured to determine a motion compensation mode used to encode a first block of picture information, the motion compensation mode including a sub-block based motion compensation prediction mode or a non-rectangular block partition mode; determine that a second block of picture information spatially neighboring the first block was decoded based on an illumination compensation; and decode the first block based on the motion compensation mode and the illumination compensation.

In general, another example of an embodiment can involve apparatus comprising one or more processors configure to determine a motion compensation mode to encode a first block of picture information, the motion compensation mode including a sub-block based motion compensation prediction mode or a non-rectangular block partition mode; determine that a second block of picture information spatially neighboring the first block was encoded based on an illumination compensation; and encode the first block based on the motion compensation mode and the illumination compensation.

In general, another example of an embodiment can involve a bitstream formatted to include encoded picture information, wherein the encoded video data are encoded by processing the picture information based on any one or more of the examples of embodiments of methods in accordance with the present disclosure.

In general, one or more other examples of embodiments can also provide a computer readable storage medium, e.g., a non-volatile computer readable storage medium, having stored thereon instructions for encoding or decoding picture information such as video data according to the methods or the apparatus described herein. One or more embodiments can also provide a computer readable storage medium having stored thereon a bitstream generated according to methods or apparatus described herein. One or more embodiments can also provide methods and apparatus for transmitting or receiving the bitstream generated according to methods or apparatus described herein.

Various modifications and embodiments are envisioned as explained below that can provide improvements to a video encoding and/or decoding system including but not limited to one or more of increased compression efficiency and/or coding efficiency and/or processing efficiency and/or decreased complexity.

The above presents a simplified summary of the subject matter in order to provide a basic understanding of some aspects of the present disclosure. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description provided below.

BRIEF DESCRIPTION OF THE DRAWINGS

The present disclosure may be better understood by consideration of the detailed description below along with the accompanying figures, in which:

FIG. 5 illustrates several examples of determining parameters of a Local Illumination Compensation (LIC) model such as that used in the Joint Exploration Model (JEM);

FIG. 15 illustrates an example of an embodiment involving illumination compensation during encoding of picture information; and FIG. 16 illustrates an example of an embodiment involving illumination compensation during decoding of picture information.

In the various figures, like reference designators refer to the same or similar features.

DETAILED DESCRIPTION

Recent efforts to improve video compression technology such as that associated with the Joint Exploration Model (JEM) being developed by the Joint Video Exploration Team (JVET), provide advanced features and tools. For example, such development efforts can include providing support for a tool such as local illumination compensation (LIC). The LIC tool involves applying a LIC model to predict a variation of illumination which may occur between a predicted block and a corresponding reference block used for motion compensated prediction. Using LIC involves determining parameters of the LIC model. However, as explained in more detail below, for certain operating modes of a video codec determining the model parameters can be problematic. One approach to solving the problem can be to prohibit use of LIC during such operating modes. In certain situations, simply prohibiting application of LIC can adversely impact compression efficiency. In general, various aspects and embodiments as described herein involve enabling use of LIC during such potentially problematic situations.

This document describes a variety of aspects, including tools, features, embodiments, models, approaches, etc. Many of these aspects are described with specificity and, at least to show the individual characteristics, are often described in a manner that can sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 1:
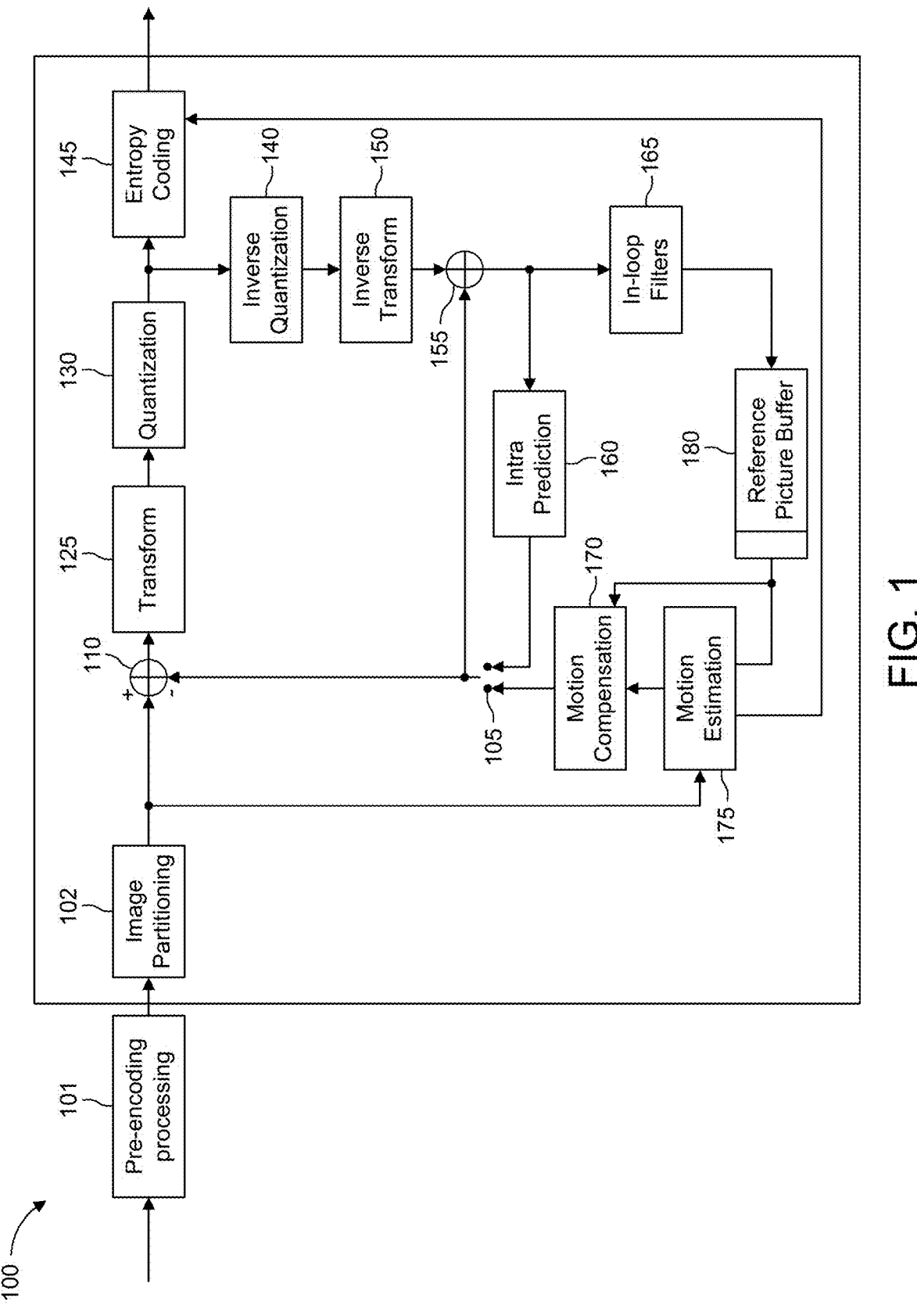
FIG. 1 illustrates a block diagram of an example of an embodiment of a video encoder.
Figure 2:
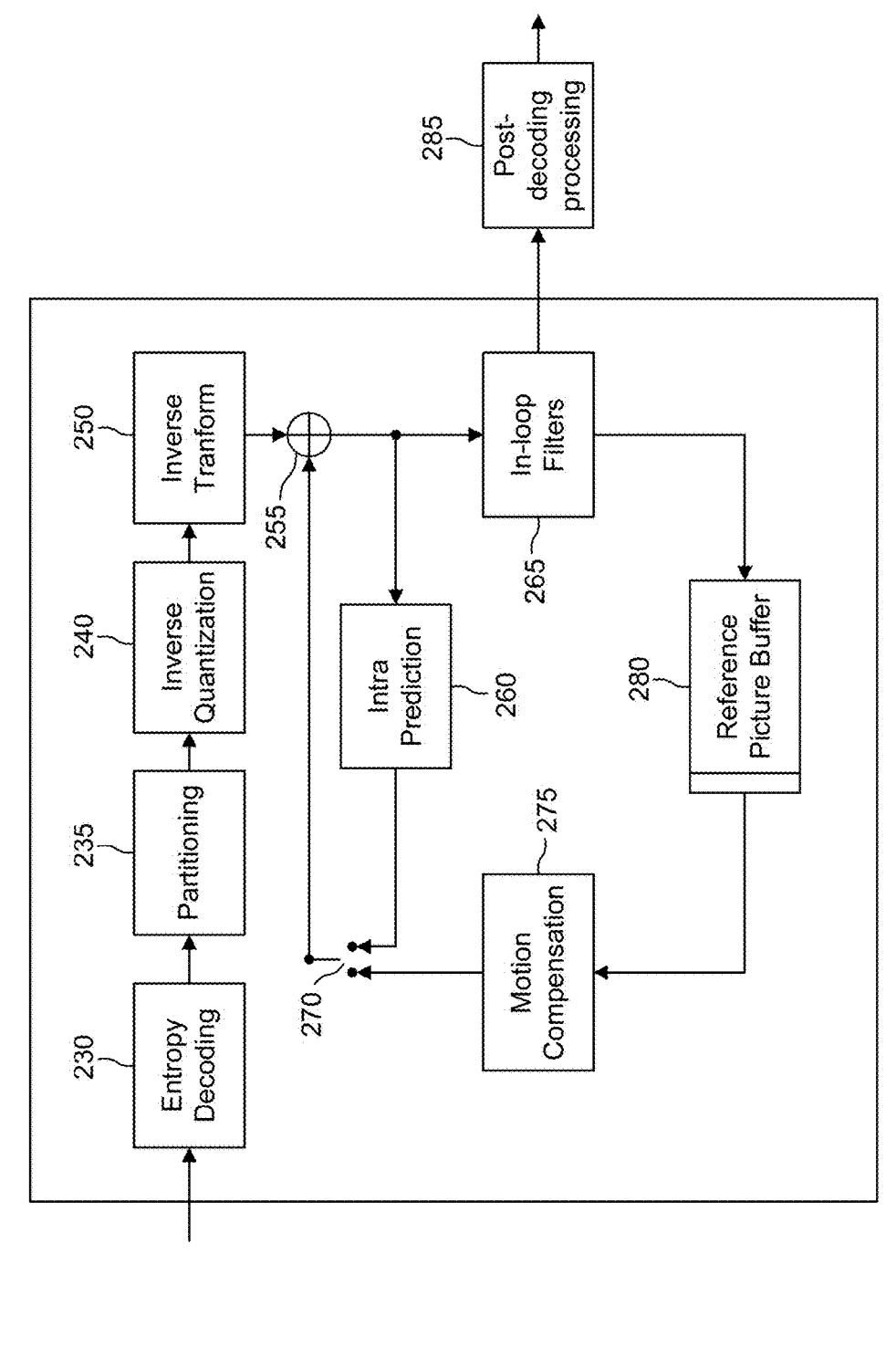
FIG. 2 illustrates a block diagram of an example of an embodiment of a video decoder.
Figure 3:
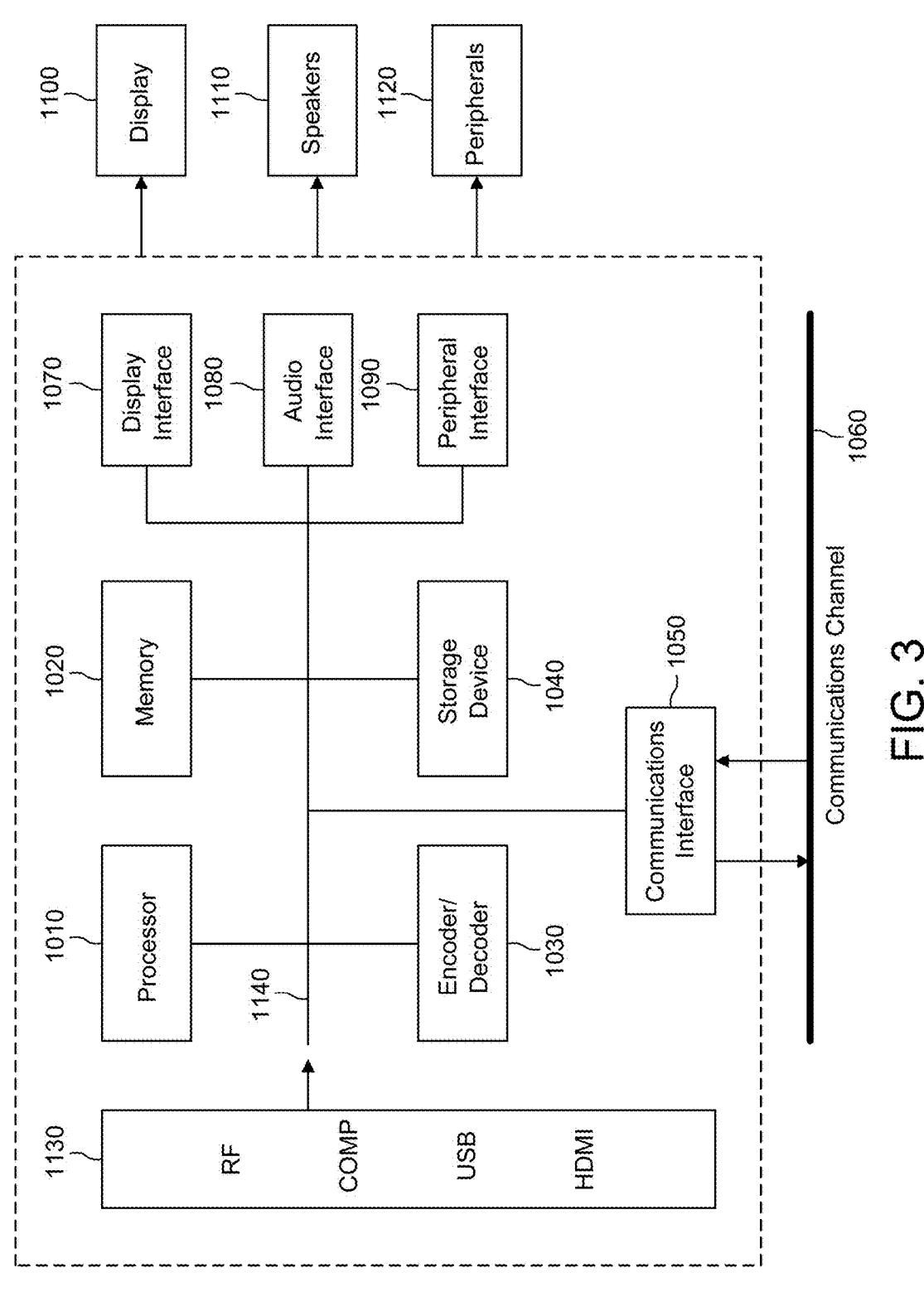
FIG. 3 illustrates a block diagram of an example of an embodiment of a system providing video encoding and/or decoding.

The aspects described and contemplated in this document can be implemented in many different forms. FIGS. 1, 2 and 3 below, as well as other figures throughout this document provide some embodiments, but other embodiments are contemplated and the discussion of FIGS. 1, 2 and 3 does not limit the breadth of the implementations. At least one of the aspects generally relates to video encoding and decoding, and at least one other aspect generally relates to transmitting a bitstream generated or encoded. These and other aspects can be implemented as a method, an apparatus, or a computer readable storage medium. For example, a computer-readable storage medium can be a non-transitory computer-readable medium. A computer-readable storage medium can have stored thereon instructions for encoding or decoding video data according to any of the methods described, and/or a bitstream generated according to any of the methods described.

In the present application, the terms "reconstructed" and "decoded" can be used interchangeably, the terms "pixel" and "sample" can be used interchangeably, the terms "image," "picture" and "frame" can be used interchangeably.

Various methods are described above, and each of the methods comprises one or more steps or actions for achieving the described method. Unless a specific order of steps or actions is required for proper operation of the method, the order and/or use of specific steps and/or actions can be modified or combined.

Various methods and other aspects described in this document can be used to modify one or more modules of a video encoder and/or decoder such as, for example, motion estimation module 170, motion compensation module 175 and/or motion compensation module 275 of a JVET or HEVC encoder 100 and decoder 200 as shown in FIGS. 1 and FIG. 2, respectively. Moreover, the present aspects are not limited to JVET or HEVC, and can be applied, for example, to other standards and recommendations, whether pre-existing or future-developed, and extensions of any such standards and recommendations (including JVET and HEVC). Unless indicated otherwise, or technically precluded, the aspects described in this document can be used individually or in combination.

Various numeric values can be used in the present document. Any specific numeric values are examples and the aspects described are not limited to these specific values.

FIGS. 1, 2 and 3 illustrate, respectively, block diagrams of examples of embodiments of an encoder 100, a decoder 200, and a system 1000. Variations of encoder 100, decoder 200 and system 1000 are contemplated, but the examples described below are provided and described for purposes of clarity without describing all possible or expected variations.

In FIG. 1, before being encoded, the video sequence can go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2 illustrates a block diagram of an example of a video decoder 200. In the decoder 200, a bitstream is decoded by the decoder elements as described below. Video decoder 200 generally performs a decoding pass reciprocal to the encoding pass as described in FIG. 1. As mentioned above, encoder 100 in FIG. 1 also generally performs video decoding as part of encoding video data, e.g., to provide a reference for further predictions.

In particular, the input of the decoder includes a video bitstream, which can be generated by a video encoder such as video encoder 100 of FIG. 1. The bitstream is first entropy decoded (230) to obtain transform coefficients, motion vectors, and other coded information. The picture partition information indicates how the picture is partitioned. The decoder can therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 3 illustrates a block diagram of a system in which various aspects and embodiments can be implemented. System 1000 can be embodied as a device including the various components described below and is configured to perform one or more of the aspects described in this document. Examples of such devices include, but are not limited to, personal computers, laptop computers, smartphones, tablet computers, digital multimedia set top boxes, digital television receivers, personal video recording systems, connected home appliances, and servers. System 1000 can be communicatively coupled to other similar systems, and to a display via a communication channel as shown in FIG. 3 and as known by those skilled in the art to implement one or more of the various aspects described in this document.

The system 1000 can include at least one processor 1010 configured to execute instructions loaded therein for implementing one or more of the various aspects described in this document. Processor 1010 can include embedded memory, input output interface, and various other circuitries as known in the art. The system 1000 can include at least one memory 1020 (e.g., a volatile memory device, a non-volatile memory device). System 1000 can include a storage device 1040, which can include non-volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples. System 1000 can include an encoder/decoder module 1030 configured to process data to provide an encoded video or decoded video.

Encoder/decoder module 1030 represents the module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processors 1010 as a combination of hardware and software as known to those skilled in the art.

Program code to be loaded onto processors 1010 to perform the various aspects described in this document can be stored in storage device 1040 and subsequently loaded onto memory 1020 for execution by processors 1010. In accordance with the embodiments, one or more of the processor(s) 1010, memory 1020, storage device 1040, and encoder/decoder module 1030 can store one or more of the various items during the performance of the processes described in this document, including, but not limited to the input video, the decoded video, the bitstream, equations, formulas, matrices, variables, operations, and operational logic.

System 1000 can include communication interface 1050 that enables communication with other devices via communication channel 1060. The communication interface 1050 can include, but is not limited to, a transceiver configured to transmit and receive data from communication channel 1060. The communication interface can include, but is not limited to, a modem or network card and the communication channel can be implemented within a wired and/or a wireless medium. The various components of system 1000 can be connected or communicatively coupled together using various suitable connections, including, but not limited to internal buses, wires, and printed circuit boards. As an example, system 1000 in FIG. 3 includes a communication network or bus 1140.

As will be explained in detail below, aspects and embodiments in accordance with the present disclosure can relate to features of the systems shown in FIGS. 1, 2 and 3 such as a motion estimation feature, e.g., module 175 of FIG. 1, and a motion compensation feature, such as module 170 of FIG. 1, and/or module 275 of FIG. 2.

For clarity of description, the following detailed description will describe aspects with reference to embodiments involving video compression technology such as, for example, HEVC, JEM and/or H.266. However, the described aspects are applicable to other video processing technologies and standards.

Figure 4:
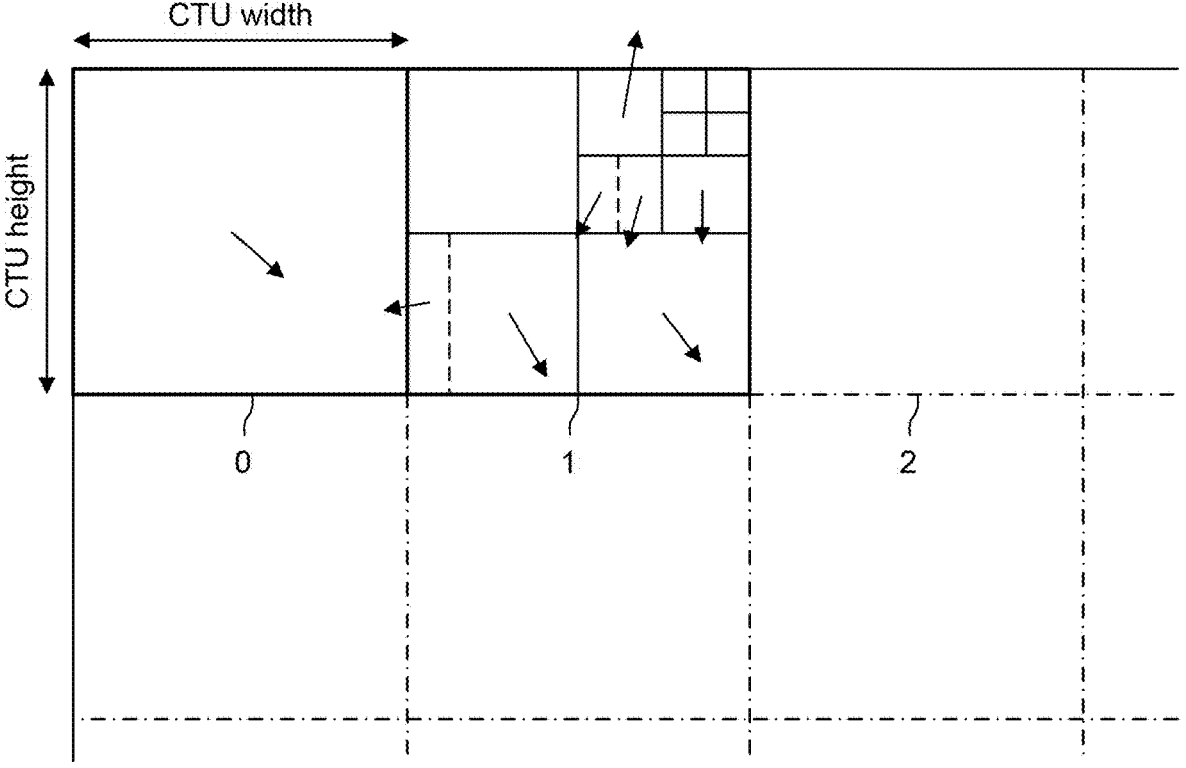
FIG. 4 illustrates an example of a Coding Tree Unit (CTU) and Coding Tree concepts such as, for example, in HEVC.

In the HEVC video compression standard, for coding a picture, a frame is first split into large blocks designated Coding Tree Units (CTU) that can possibly be further split into smaller Coding Units (CU) as depicted in FIG. 4. For coding a CU, a Prediction Unit (PU) is built from neighboring reconstructed samples (intra prediction) or from previously reconstructed pictures stored in the Decoded Pictures Buffer (DPB) (inter-prediction). Next, the residual samples calculated as the difference between original samples and PU samples, are transformed and quantized.

In inter-prediction, motion compensated temporal prediction is employed to exploit the redundancy that exists between successive pictures of a video. To do so, a motion vector is associated to the PU and a reference index 0 (refIdx0) indicates which reference picture of a list of candidate pictures to use (LIST_0).

In the Joint Exploration Model (JEM) and in the VVC reference software developed by the JVET (Joint Video Exploration Team) group, some additional temporal prediction tools with associated parameters determined at the decoder side have been proposed. One such tool is Local Illumination Compensation (LIC). Basically, the purpose of LIC is to compensate for illumination change which may occur between a predicted block and its reference block employed through motion compensated temporal prediction.

The use of LIC is typically signaled at the CU level through a flag (LIC flag) associated with each coding unit (CU) coded in inter mode. When this tool is activated and LIC flag is true, the decoder computes some prediction parameters based on reconstructed picture samples located on the left and/or on the top of the current block to be predicted and the corresponding reference picture samples located on the left and/or on the top of the reference block as illustrated in FIGS. 5A, 5B and 5C. More specifically, FIGS. 5A, 5B and 5C illustrate that LIC parameters are derived from neighboring reconstructed samples and the corresponding reference samples translated with motion vectors (MV) for a square CU (FIG. 5A), a rectangular CU (FIG. 5B) and a sub-block-based prediction (FIG. 5C). The description herein will refer to the set composed of the samples situated in the row above the current (or reference) block and the samples situated in the column at the left of the current (or reference) block will be referred to as "L-shape" associated to the current or reference block. Examples of L-shapes are illustrated shaded in grey in FIGS. 5A, 5B and 5C.

Certain tools can be based on partitioning of a CU or block into sub-blocks, e.g., 4×4 as illustrated in the right side of FIG. 5C. For certain sub-block-based tools, the reference L-shape may be composed of non-adjacent samples if the motion vectors associated to each sub-blocks are different such that the MV indicate non-adjacent sub-blocks in the reference as illustrated in FIG. 5C. A set of non-adjacent sub-blocks such as those illustrated on the left side of FIG. 5C can be referred to as a "quasi L-shape". Examples of sub-block-based motion compensated prediction modes are:

Affine merge motion prediction,

Affine AMVP (Adaptive motion vector prediction) motion prediction,

Subblock-based temporal motion vector prediction (SbTMVP),

Decoder side motion vector refinement (DMVR).

LIC can be based on a model of illumination changes such as a first order linear model of illumination changes using a scaling factor a and an offset b. In the case of a linear model, model parameters a and b are derived from the reconstructed and reference samples of the L-shape or quasi L-shape.

LIC parameters can be chosen based on any of various approaches. For example, LIC parameters can be selected based on minimizing an error, or local distortion, between current samples and linearly modified reference samples for local distortion defined as:

$$dist = \sum_{e \in Vcur, s \in Vref} (\text{rec\_cur}(r) - a.\text{rec\_ref}(s) - b)^2 \qquad \text{Equation 1}$$

Local Distortion where:

rec_cur(r) is a neighboring reconstructed sample in current picture (FIG. 5—right side); and rec_ref(s) is a reference sample built with motion compensation (MC) from reference picture (FIG. 5—left side), corresponding to reconstructed sample r, with s=r+mv. rec_cur(r) and rec_ref(r) are colocated samples in the reconstructed and reference L-shape respectively.

The value of (a,b) can be obtained using a least square minimization:

$$a = \left( \frac{\sum ref(s) \times cur(r) - \frac{\sum ref(s) \times \sum cur(r)}{N}}{\sum cur(r)^2 - \frac{\sum ref(s) \times \sum ref(s)}{N}} \right) \qquad \text{Equation 2}$$

$$b = \frac{\sum cur(r)}{N} - a \times \frac{\sum ref(s)}{N}$$

(a, b) Formula using Least Square Minimization

Note that the value of N may be further adjusted (reduced incrementally) for the sum terms in Equation 2 to remain below the maximum integer storage number value allowed (e.g. $N < 2^{16}$). Also, in Equation 2 the sub-sampling of the top and left samples set can be incremented for large blocks.

Another example of an approach to deriving the LIC parameters can involve using mean absolute deviations. For example, the LIC parameters can be determined using the sums of absolute differences (SAD) as follows:

$$a = \left( \frac{\Sigma abs\left( cur(r) - \frac{\sum cur(r)}{N} \right)}{\Sigma abs\left( ref(s) - \frac{\Sigma ref(s)}{N} \right)} \right)$$

$$b = \frac{\Sigma cur(r)}{N} - a \times \frac{\Sigma ref(s)}{N}$$

where:

cur(r) is a neighboring reconstructed sample in current picture (e.g., right side of FIG. 5B), ref(s) is a reference sample built with motion compensation (translated by a motion vector my) from reference picture (e.g., left side of FIG. 5B), and $s=r+mv.$ Another example of an approach to deriving the LIC parameters can involve using minimum and maximum reconstructed samples values of the L-shape to determine the parameter "a". Once "a" is known, "b" can be derived as, for example, $b=y_{mean}-a*x_{mean}$ (see equation for "b" in Equation 2), where $(x_{mean}:y_{mean})$ are the average of the reference and reconstructed samples, respectively.

Once the LIC parameters are obtained by the encoder or the decoder for the current CU, then the prediction pred (current_block) of current CU can be determined from the following equation for the uni-directional prediction case:

$$\text{pred(current\_block)}=a\times\text{ref\_block}+b \qquad \text{Equation 3}$$

where current_block is the current block to predict, pred (current_block) is the prediction of the current block, and ref_block is the reference block built with a regular motion compensation (MC) process and used for the temporal prediction of the current block.

Note that the set of neighboring reconstructed and the set of reference samples (see gray samples in FIG. 5) have the same number and same pattern. The description herein will refer to "left samples" to denote the set of neighboring reconstructed samples (or the set of neighboring reference samples) situated at the left of the current block (or reference block) and will refer to "top samples" to denote the set of neighboring reconstructed samples (or the set of neighboring reference samples) located at the top of the current block (or reference block). Reference to "samples set" will denote the union of "left samples" and "top-samples" sets.

Figure 6:
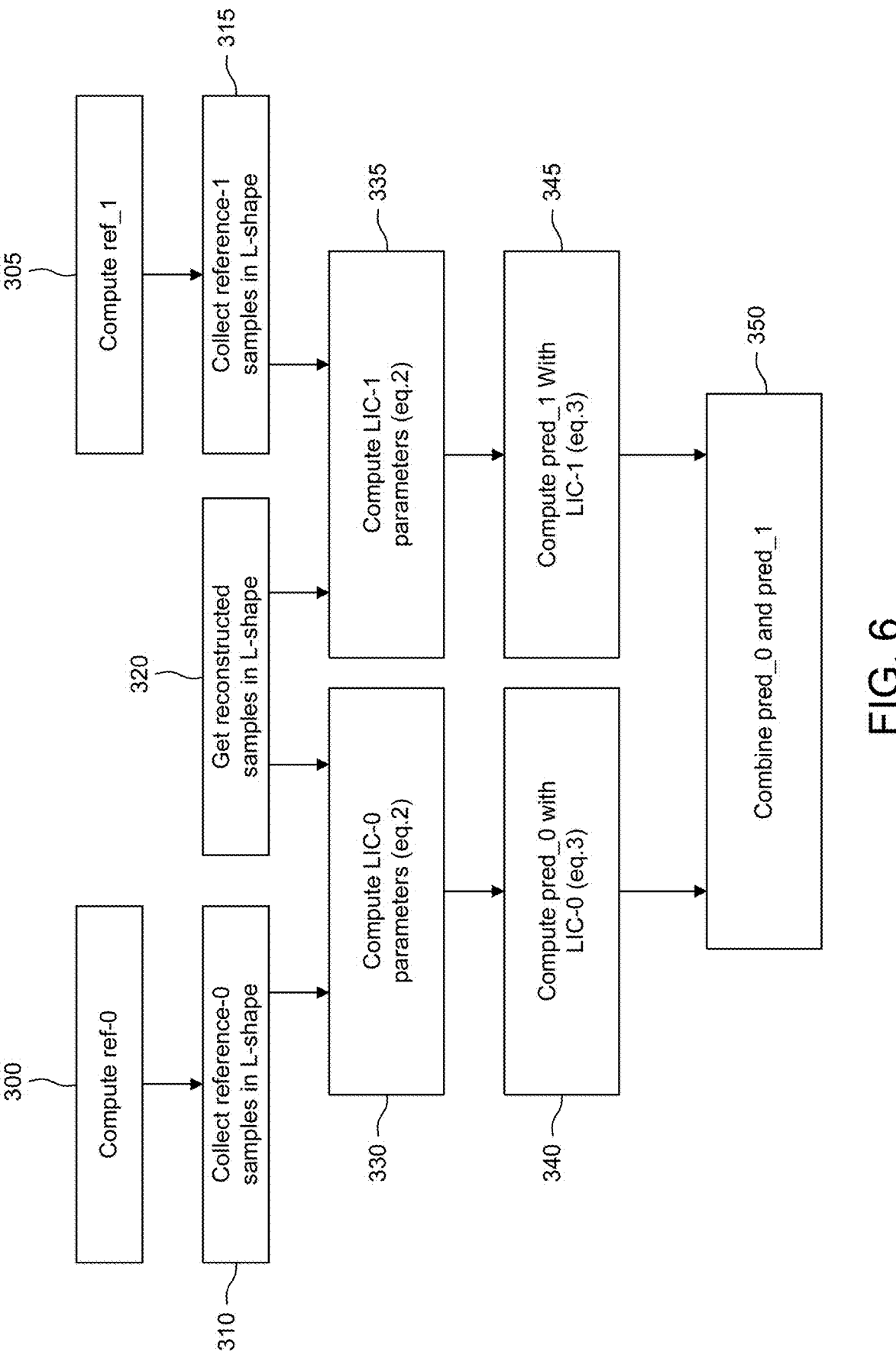
FIG. 6 illustrates an example of derivation of LIC parameters for bi-prediction.

In case of bi-prediction, the LIC process can be applied twice as illustrated in FIG. 6. First, the LIC process is applied for reference 0 prediction (LIST-0) as illustrated by 300, 310, 320, 330, and 340 in FIG. 6. Second, the LIC process is applied for reference 1 prediction (LIST_1) as illustrated by 305, 315, 320, 335, and 345 in FIG. 6. The operations at 305, 315, 335 and 345 can be the same as, i.e., merely repeated execution of, those at 300, 310, 330 and 340, respectively, but are shown as separate in FIG. 6 for purposes of illustration. Next, the two predictions are combined together as usual at 350 using default weighting (P=(P0+P1+1)>>1) or bi-prediction weighted averaged (BPWA): P=(g0.P0+g1.P1+(1<<(s-1)))>>s). The method of FIG. 6 will be referred to herein as method-a.

Figure 7:
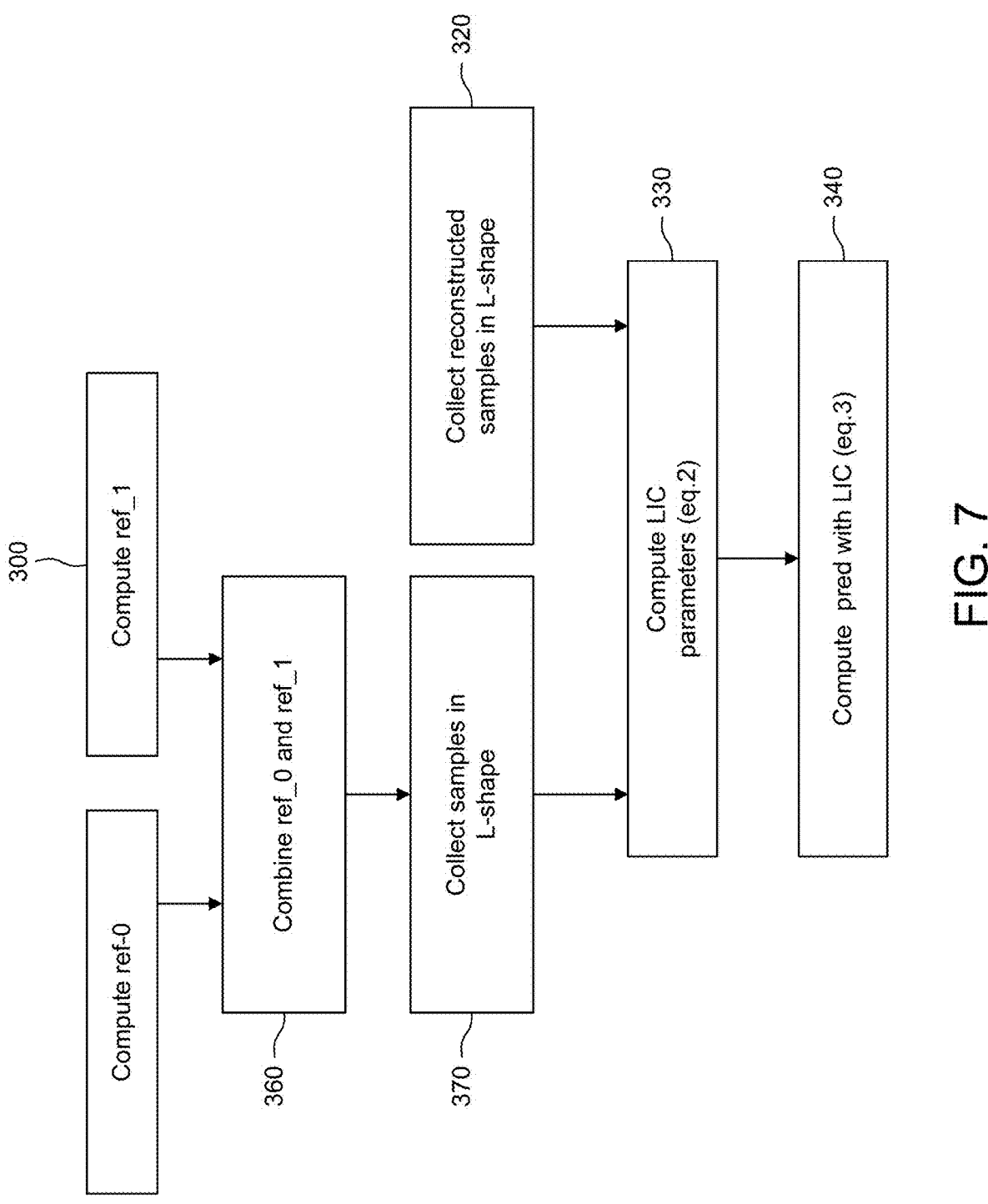
FIG. 7 illustrates another example derivation of LIC parameters for bi-prediction.

In a variant referred to herein as method-b and illustrated in FIG. 7, in case of bi-prediction, the two regular predictions can be performed and combined first followed by a single application of the LIC process.

In another variant (method-c based on method-b), in case of bi-prediction, the LIC-0 and LIC-1 parameters can be derived directly using least square minimization for example:

$$dist = \qquad \text{Equation 2bis}$$
$$\sum_{r\in Vcur,s\in Vref}(rec_{cur(r)}-a0*rec_{ref0(s)}-a1*\text{rec\_ref1}(s)-b)^2$$

In another variant, the set of reference (or reconstructed) samples situated at the left (or top) of the current block are not necessarily consecutive because they can have been sub-sampled and/or one can discard some reconstructed samples depending on some properties.

Some restrictions can apply in the choice of the left and top samples (see gray samples in FIG. 5) used to derive the LIC parameters:

R1) The number of samples of the samples set should be a power of 2 so that the divisions can be implemented using right shifting (eq.2 or eq.2bis for example)

R2) The number of left ($N_L$) and top ($N_T$) samples is the same and is equal to $$N_S(N=2*N_S) \qquad \text{Equation 4}$$

where:
n=min(cuHeight, cuWidth)

$$x=\log2(n)$$

$$N_S=2^x$$

R3) The step between left (stepV) or top (stepH) samples is equal to:

$$\text{stepV}=\text{cuHeight}>>\log2(N_S) \qquad \text{Equation 5}$$

$$\text{stepH}=\text{cuWidth}>>\log2(N_S)$$

Figure 8:
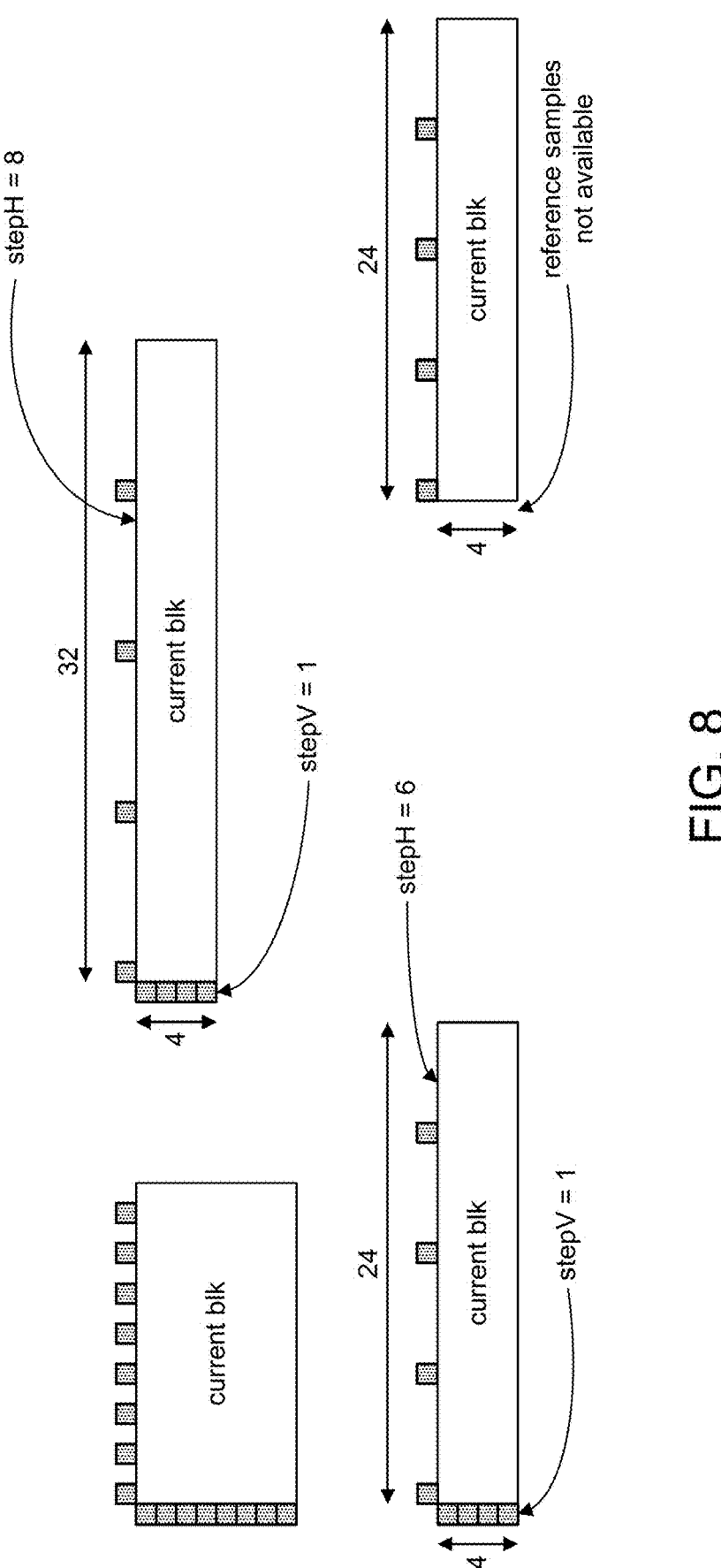
FIG. 8 illustrates examples of positions of left and top reference samples for rectangular Coding Units (CU)

Examples of positions of left and top reference samples for rectangular CUs in accordance with the preceding restrictions are illustrated in FIG. 8.

Figure 9:
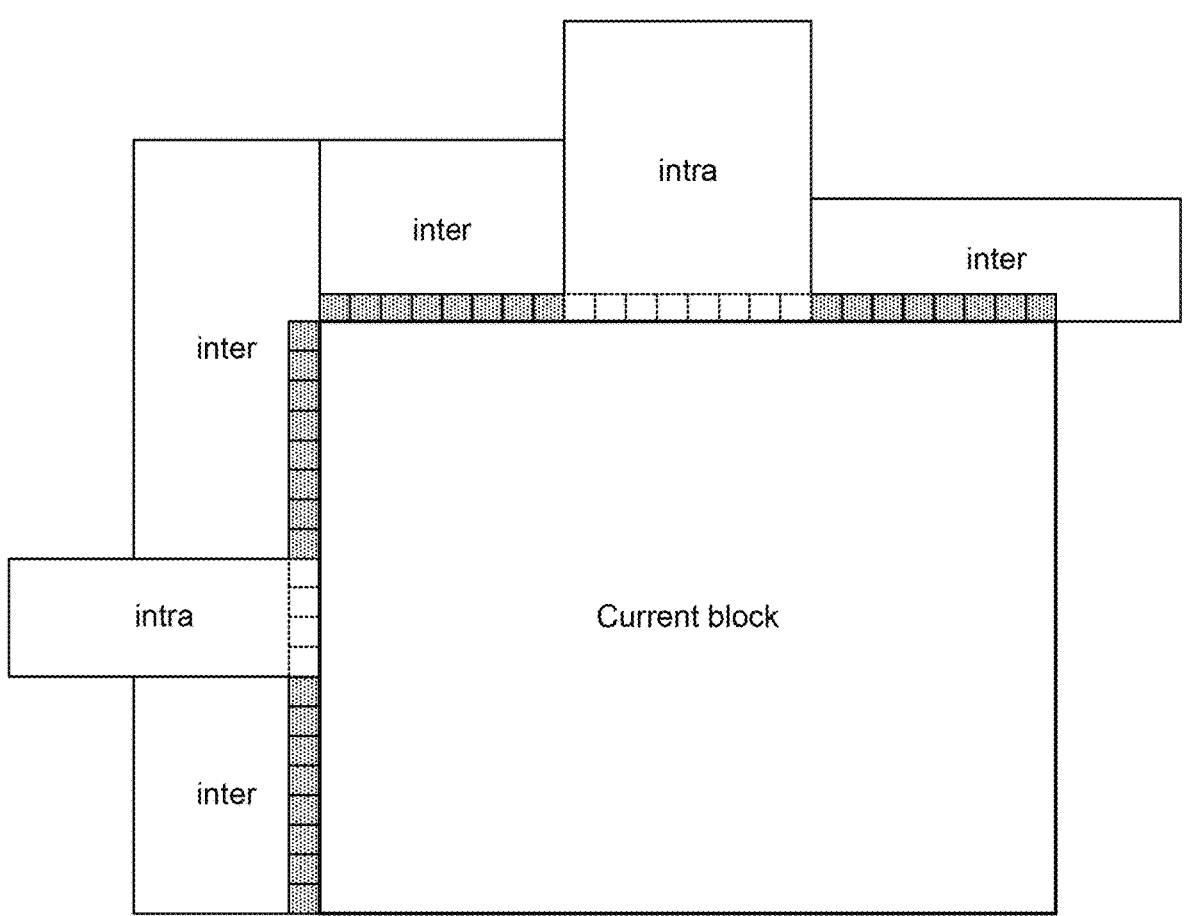
FIG. 9 illustrates an example of LIC parameter derivation involving restricted access to certain samples, e.g., intra samples not available due to a criterion such as pipeline design.

Another example includes discarding the reconstructed samples built with intra-prediction process as illustrated in FIG. 9. That is, FIG. 9 illustrates LIC parameter computation based on restricted access to samples. In FIG. 9, only samples in grey are available for parameter computation; samples in white are not available. For example, access to intra samples might be restricted due to factors such as pipeline processing requirements.

In subblock-based temporal motion vector prediction (SbTMVP) method, similarly to the temporal motion vector prediction (TMVP) in HEVC, the motion field in the collocated picture is used to improve motion vector prediction and merge mode for CUs in the current picture. SbTMVP predicts motion at sub-CU level. A motion shift is applied before fetching the temporal motion information from the collocated picture, where the motion shift is obtained from the motion vector from one of the spatial neighboring blocks of the current CU, and not the collocated block.

Figure 10:
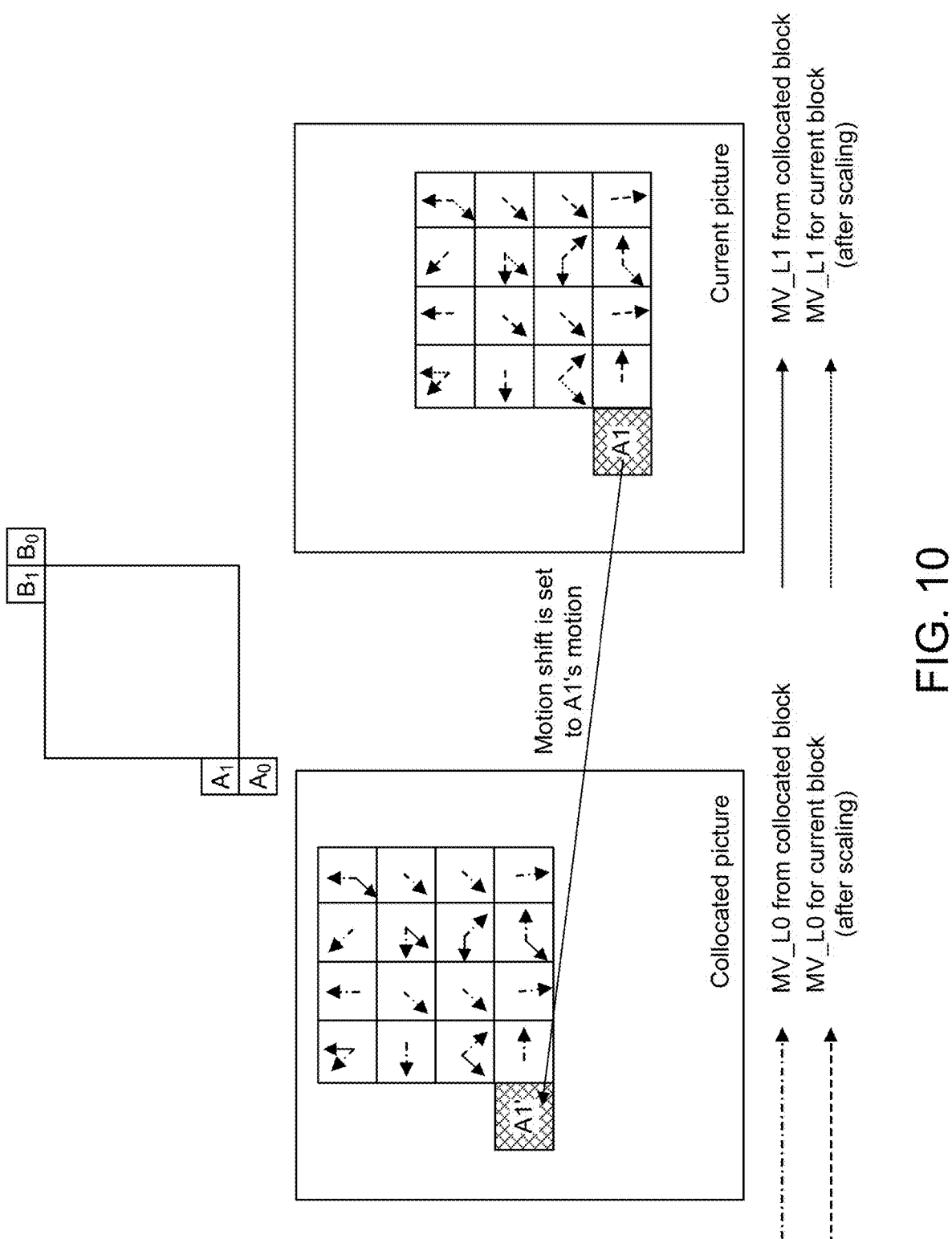
FIG. 10 illustrates an example of a SbTMVP process (e.g., in Versatile Video Coding (VVC))

An example of a SbTVMP process is illustrated in FIG. 10. SbTMVP predicts the motion vectors of the sub-CUs within the current CU in two steps. In a first step, the spatial neighbors used for ATMVP are illustrated in the upper portion of FIG. 10 and are examined in the order of A1, B1, B0 and A0. The first spatial neighboring block that has a motion vector that uses the collocated picture as its reference picture is identified. The identified motion vector is selected to be the motion shift to be applied. If no such motion is identified from the spatial neighbors, then the motion shift is set to (0, 0).

A second step involves applying the motion shift from a spatial neighbor identified in the first step (e.g., MV of block A1 in the example shown in the lower portion of FIG. 10) and scaling the motion information from the corresponding collocated sub-CUs. In more detail, applying the motion shift involves adding the motion shift information to the current block's coordinates to obtain sub-CU-level motion information (motion vectors and reference indices) from the collocated picture. Then, for each sub-CU, the motion information of its corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

The encoding logic of the additional SbTMVP merge candidate is the same as for the other merge candidates. That is, for each CU in P or B slice, an additional rate distortion (RD) check is performed to decide whether to use the SbTMVP candidate.

Figure 11:
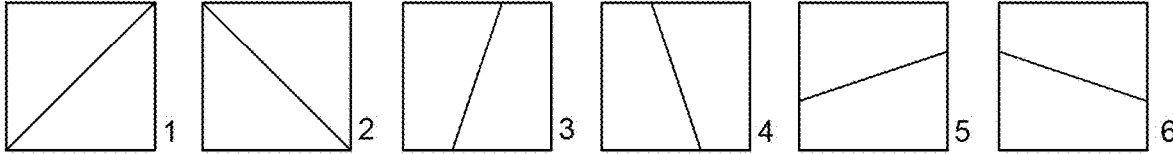
FIG. 11 illustrates examples of partitioning a CU into non-rectangular portions, e.g., Prediction Units (PUs) and associated diagonal weighting between PUs.
Figure 11:
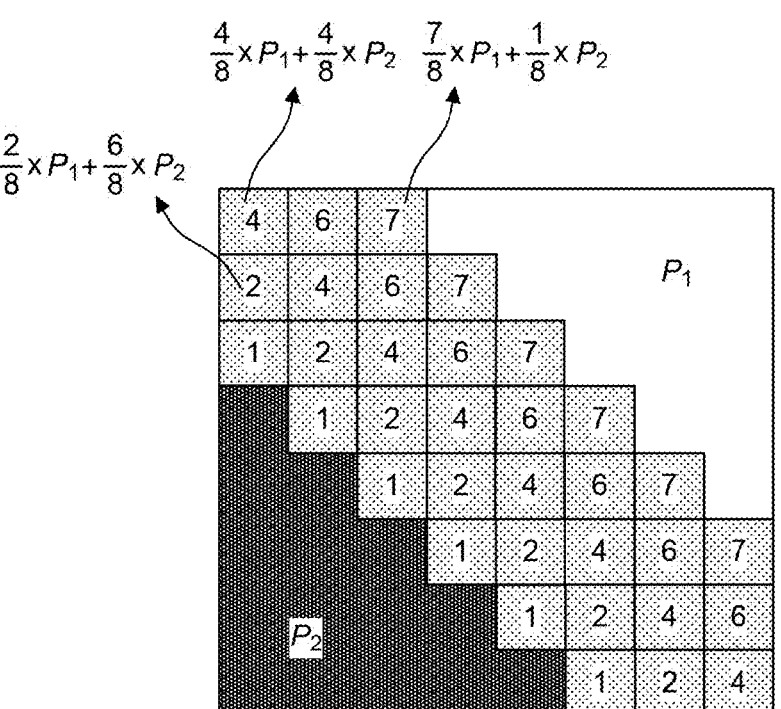

In case of non-rectangular predictions, the CU prediction is composed of two non-rectangular predictions (PU) as depicted in the examples shown in the upper portion of FIG. 11. In this mode, the block is split by a non-horizontal or non-vertical line, resulting in two portions. The coding mode is generally called geometric partitioning (GEO), or triangle, and may also be referred to generally herein as a non-rectangular mode. The PUs have different motion vectors. In case of merge mode, each vector comes from a different spatial or temporal neighbor. The lower portion of FIG. 11 illustrates the associated diagonal weighting between the PUs.

Figure 12:
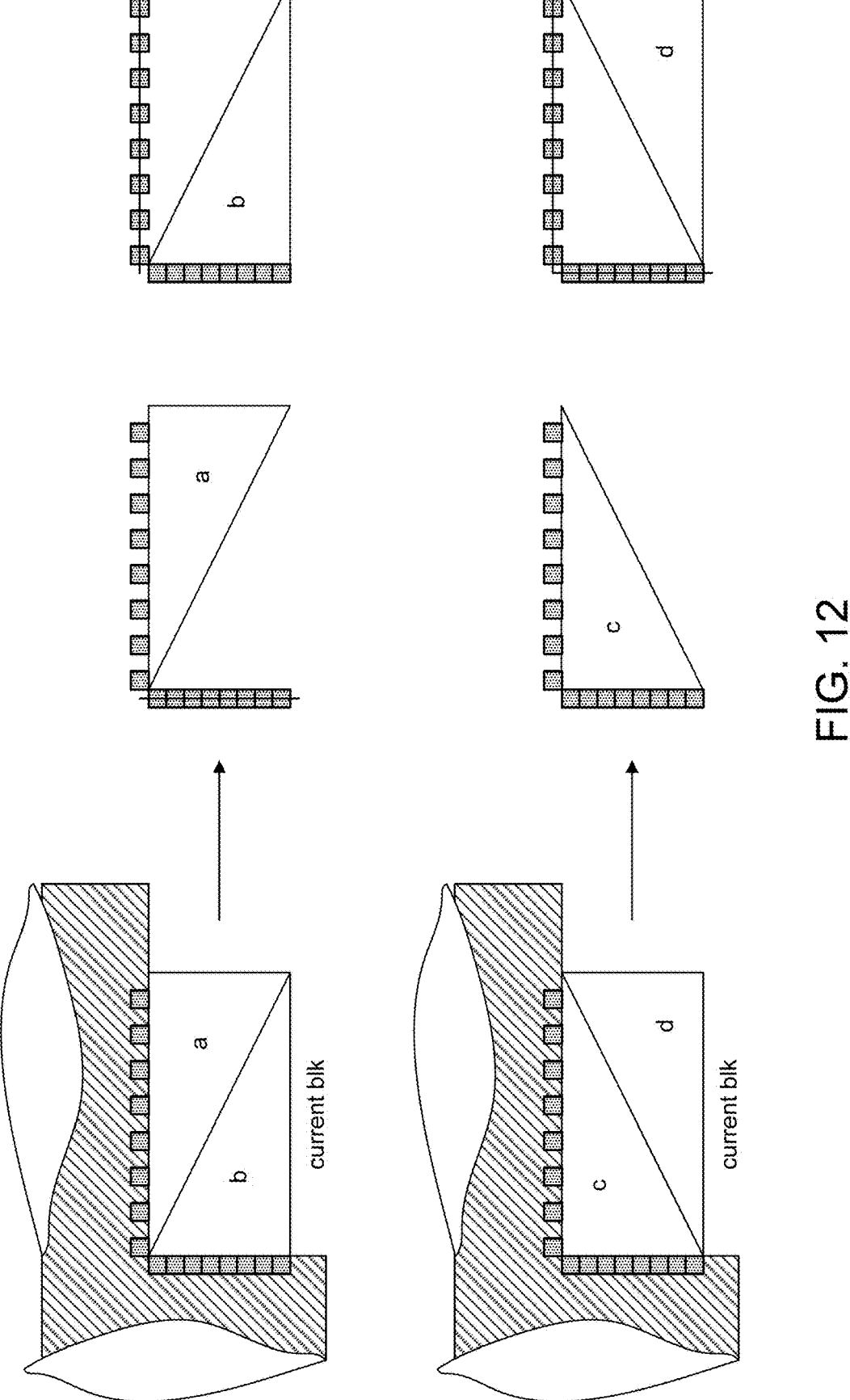
FIG. 12 illustrates two examples of triangular CU partitioning (left) and associated PU pairs (right)

It may happen the default position of the sample sets for the current CU are not suited to the associated PUs. Appropriate selection of used neighboring samples depending on the PU is illustrated in FIG. 12 for triangular partitioning. Sample sets may be far from and not contiguous to the PU samples.

In that case, advantageously only the samples which are spatially contiguous to the PU triangle may be used to derive the LIC parameters. For example, in case of a triangle configuration such as that shown in the top left of FIG. 12, only "top-samples" set for triangle "a" (N=NT) and only "left-samples" set for the triangle "b" (N=NL) are used. In the case of the triangle configuration example shown at the bottom left of FIG. 12, both "top-samples" and "left-samples" sets are used for triangle "c" and LIC-flag is inferred to be false for the triangle "d".

The same policy may apply for the four non-rectangular partitions illustrated on the top right of FIG. 11, where only the samples pertaining to the dimension where PU size and CU size are the same are kept. It means that the non-rectangular PU partitioning examples 3 and 5 in FIG. 11 will have same sample sets as PU triangles of example 1, and the non-rectangular PU partitioning examples 4 and 6 will have same sample sets as PU triangles of example 2. In a variant, in the case of the left PU of partitioning examples 3 and 4 in FIG. 11, only the "left samples" and a sub-set of "top-samples" are used, where the sub-set of "top-samples" are the "top-samples" which are contiguous to the left PU. In the case of the right PU of partitioning example 3 in FIG. 11, one may use the sub-set of "top-samples" which are contiguous to the right PU. The same principle may be applied for the selection of reference samples for PU partitioning examples 5 and 6 in FIG. 11 with sub-set of "left-samples".

In some of the cases presented above, an LIC process can be problematic, e.g., decrease compression efficiency. For example, in a subblock-based temporal motion vector prediction (SbTMVP) case, sub-block motion may be different and vary significantly among sub-blocks. The sub-blocks may also use different reference pictures. On the one hand, using the same LIC parameters for the whole CU (the multiple sub-blocks) may create visible artifacts and decrease compression efficiency consequently. On the other hand, computing LIC parameters per sub-block using sub-block neighbors would create a reconstruction dependency between sub-blocks that may make pipeline processing implementations problematic or impossible in terms of pipeline complexity constraints. In the case of triangle partitions, neighboring samples may not be available, and LIC cannot be applied efficiently. Thus, in an example of a codec such as early experimental implementations of the VVC, LIC is not allowed for the described problematic modes, leading to reduced compression efficiency.

In general, at least one embodiment described herein addresses such problems and provides for LIC in such situations. That is, in general at least one embodiment can provide for LIC flag inference in case of sub-block temporal motion vector prediction and triangle partitions, both for the merge and classical inter modes. In general, at least one embodiment improves the derivation of local illumination compensation (LIC) activation for sub-block-based temporal motion vector prediction (SbTMVP), and for triangle partitions by efficiently controlling LIC usage and LIC parameters computation. In general, at least one embodiment modifies the LIC flag propagation in merge mode or controls the LIC flag signaling when necessary. Depending on the prediction and/or sub-partitioning of the current CU, LIC can be inferred based on more information than just the neighboring block's LIC flag.

Regarding SbTMVP, the motion compensation is done by sub-blocks. For LIC to be efficient in terms of compression, the motion of the sub-blocks needs to be close, e.g., same reference picture and/or similar motion. Moreover, in a codec implementation such as the current implementation of VVC, a LIC flag is not saved between frames. In addition, motion on sub-blocks does not have LIC information. In general, at least one embodiment addresses these limitations, thereby enabling expansion and/or improvement of LIC usage.

Figure 13:
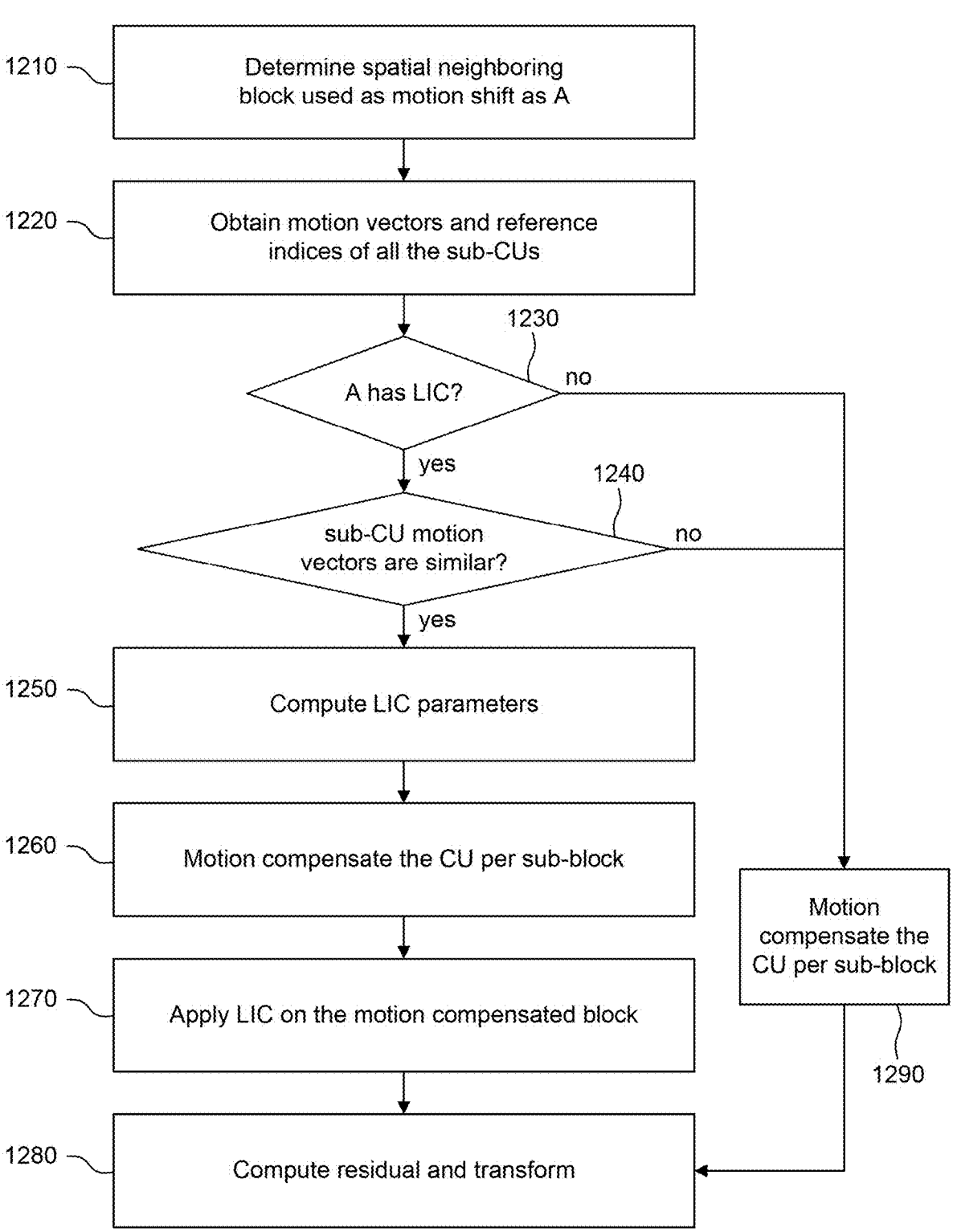
FIG. 13 illustrates an example of an embodiment of LIC derivation and application for a SbTMVP merge block.

An example of at least one embodiment of LIC derivation in accordance with the present disclosure is illustrated in FIG. 13. In FIG. 13, at 1210 the spatial neighboring block A used as motion shift is determined. At 1220, motion vectors and reference indices of all the sub CUs are obtained. At 1230, LIC is enabled if the spatial neighbor A used for motion shift has LIC applied. Therefore, the motion or motion shift is determined based on temporal information and LIC activation is determined based on spatial information.

In a variant, LIC can be used for the current CU if all the sub-block motion vectors are similar as determined at 1240. For example, all the sub-block motion vectors can be considered to be similar if they all use the same reference picture(s), have all the same direction (unidirectional or bidirectional with the same reference index(es)), and the vectors are close to each other in magnitude (e.g., the standard deviation of each component of the motion vectors is less than a threshold (e.g., 5 pixels or samples)). Other metrics can be used, e.g., for controlling complexity. One example of an alternative metric is evaluating the maximum value of the difference between the max and the min of each vector component of vectors $v_i$ and comparing to a limit or threshold, e.g., max(max($v_i$.x)−min(vi.x), max($v_i$.y)−min (vi.y)). Another example of a metric is determining the average difference between the first vector (in the scan order, i.e. top-left sub-block) and each sub-block vector and comparing to a limit or threshold, e.g.: average difference=sum (vi.x−v0.x+vi.y−V0.y)/(number of vectors).

If at 1240 it is determined that LIC has been disabled ("no" at 1240) then the block is motion compensated at 1290 and the residual is transformed and coded as usual at 1280. If LIC is applied ("yes" at 1240) then LIC parameters are computed at 1250, for example using the quasi L-shape method shown in FIG. 5C and described above. Next, at 1260, the block is motion compensated by sub-block. Then, at 1270, LIC is applied for the whole CU. Finally, the residual is transformed and coded at 1280.

In general, at least one other example of an embodiment is compatible with and can be combined with other methods for LIC parameter computation, e.g., LIC parameters derivation for sub-block based motion compensation such as for Affine or DMVR. In the case of Affine mode, one or more embodiments are compatible with applying LIC compensation as described herein including determining LIC parameters based on evaluating a quasi-L shape as illustrated in FIG. 5C and described above. For the DMVR case, if the LIC process is originally inferred to be active or enabled (LIC flag inferred to be "true"), the LIC process can be disabled as a result of the DMVR process (sub-block refinement of the motion vector at the decoder side), e.g., if motion vectors output from the DMVR process are not similar.

At least one other example of an embodiment involving sub-CU motion similarity may additionally constrain the motion vectors to all be unidirectional for LIC to be applied.

In at least one other example of an embodiment, if LIC information of temporal motion prediction is available then determining sub-CU motion similarity may additionally involve constraining the vectors to have LIC enabled.

In at least one other example of an embodiment, LIC flag can be signaled instead of being derived from a spatial neighbor. If the sub-CU motion constraints are fulfilled, the LIC flag is encoded (encoder) or decoded (decoder), and LIC is applied if appropriate. This implies the encoder operates to find the appropriate LIC flag value (i.e., ON or OFF). For example, the encoder processes the video data both with LIC ON and with LIC OFF and evaluates the performance in each case based on a metric (e.g., rate-distortion ratio (classical RDO (Rate-Distortion Optimization)). Then, the encoder operates based on the LIC flag value or configuration leading to the best performance.

Turning now to the triangle partition case (only available in merge), the CU is split into two PUs, where each PU has its own motion, e.g., coming from a different neighbor in the current implementation of VVC. The block is compensated twice (once for each motion vector) then the two predictions are blended using weights depending on the split direction, as depicted in the lower half of FIG. 11.

Figure 14:
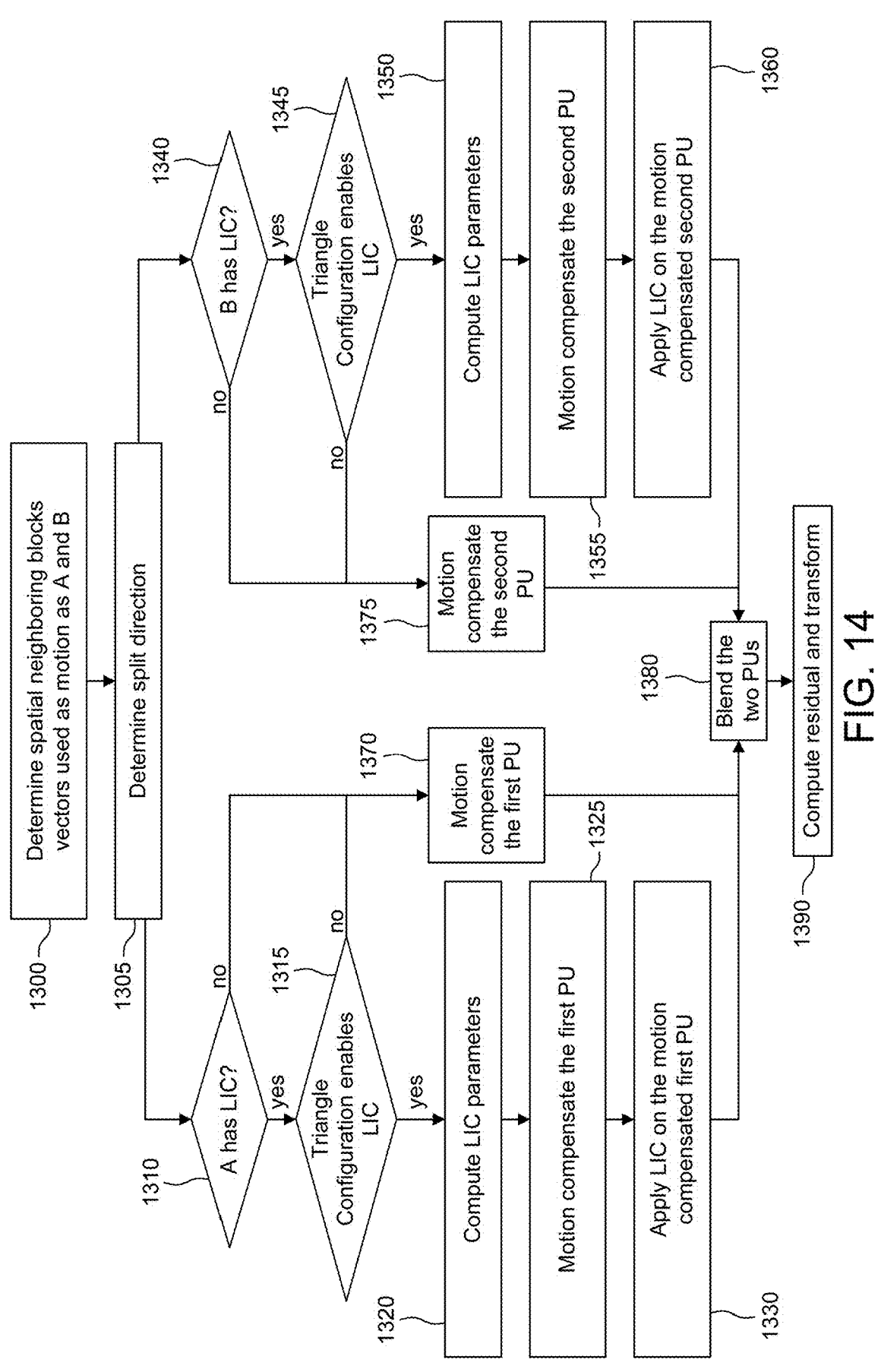
FIG. 14 illustrates an example of an embodiment of LIC derivation and application for triangular partitions.

In general, at least one example of an embodiment can involve LIC application depending on the neighbor vector LIC information, the split direction and a PU index. FIG. 14 depicts an example of LIC parameter derivation and application for triangle partitions. In FIG. 14, A and B refer to the spatial neighboring blocks used to derive the motion of the two PU triangle partitions. At 1300 in FIG. 14, vectors used as motion information for neighboring blocks A and B are determined. At 1305, the split direction is determined (e.g., 45° or 135°). LIC first must be inferred from neighboring blocks used as motion prediction (1310 and 1340 for A and B, respectively). For a given PU, if its neighbor has LIC enabled, then LIC can be considered for this PU. LIC is enabled or used for the PU if the split direction (determined at 1305) and PU index (see Table 1 below) allow it as determined for A and B at 1315 and 1345, respectively. If LIC is enabled or used as determined at 1315 (and/or at 1345) then LIC parameters are computed at 1320 (and/or at 1350) followed by motion compensation at 1325 (and/or at 1355) and application of LIC on the motion compensated PU at 1330 (and/or 1360). If a PU does not have LIC ("no" at 1310 and/or 1340) and/or the triangle partition does not enable or permit LIC ("no" at 1315 and/or 1345) then the PU is motion compensated (1370 and/or 1375). Following 1330, 1360, 1370 or 1375, the two PUs are blended at 1380 (e.g., as illustrated in the lower half of FIG. 11) followed by computing the residual and transforming at 1390.

In at least one other example of an embodiment, the LIC parameter derivation may have some constraint on the use of given reference samples depending on the PU index such as the example illustrated in Table 1.

TABLE 1

| | | LIC derivation for triangle partitions. LIC activation and parameters derivation | | |
|---|---|---|---|---|
| | | triangle direction 45° [/] | | triangle direction 135° [\] |
| | | PU index | | |
| | 0 (top-left) | 1 (bottom-right) | 0 (bottom-left) | 1 (top-right) |
| Use LIC | yes | no | yes | yes |
| reference samples | no (top and | — | left only | top only |
| restriction | left samples) | | | |

In at least one other example of an embodiment, if a neighboring block for current PU (A or B, depending on triangle index) has LIC then LIC can be applied as usual, regardless of the split direction or PU index.

In at least one other example of an embodiment, the same LIC parameters can be used for both PUs based on an averaged model involving first computing LIC parameters for each PU and then averaging the two LIC parameter sets.

An implementation such as VVC implements only uni-prediction LIC due to complexity issues. However, triangle partitioning is implemented as bi-prediction. The bi-prediction pipeline is used with each triangle using one prediction before merging with pixel-wise, or sample-wise, blending. Implementing LIC in such a context may involve computing the full bi-prediction before applying LIC to have only one LIC block in the pipeline (instead of one LIC block per prediction), such as in the embodiment illustrated in FIG. 7. For the LIC triangle case, computing the full bi-prediction before applying LIC can involve applying the embodiment example just described, i.e., derive only one LIC parameter set to apply to both predictions.

At least one other example of an embodiment can involve using the same LIC parameters for both PUs based on the first PU only. For example, in the case of a 45° split, compute LIC parameters for the first PU and use the same LIC parameters for the second PU. In a variant, the LIC parameters of the first PU are used for LIC for the second PU only if motion of the second PU is "similar" to that of the first PU. The property of "similar" can comprise a combination of at least one of having the same reference picture or a difference between each component of the motion vectors satisfying a criterion such as being less than a particular value, e.g., 5 pixels or samples. In another variant, the LIC parameters of the first PU are used for the second PU, but LIC is applied only if a neighbor associated to the second PU has LIC.

In at least one other example of an embodiment, one LIC flag is signaled for each PU instead of being derived from neighbors. If the split direction and PU index constraints are fulfilled, the LIC flag is (de)coded, and LIC is applied if appropriate. In a variant, only one LIC Flag is signaled for both PUs.

In case of temporal motion vector prediction, the motion vector is predicted from a previously encoded frame. The LIC flag can be inferred from this motion vector predictor. However, in an implementation such as VVC, the LIC flag is not available for temporal predictors as explained above. In that case, the LIC flag can be inferred from a spatial neighbor. For example, if at least one of A0, A1, B0, B1 neighbors (FIG. 10—top) has LIC enabled, apply LIC. In a variant, a condition for propagating LIC can involve requiring more than one neighbor to have LIC enabled. In another variant, LIC is applied if a spatial neighbor has LIC and the motion of the current PU is "close" or similar to the given neighbor motion where "close" can be defined as having the same reference and a vector difference satisfying a particular criterion referred to herein as a similarity criterion, e.g., less than 5 pixels or samples difference for each component.

Another example of an embodiment is shown in FIG. 15. In FIG. 15, at 1510 a motion compensation mode used to encode a first block of picture information is determined. For example, the motion compensation mode can include a sub-block based motion compensation prediction mode or a non-rectangular block partition mode. The non-rectangular block partition mode can be, for example, a GEO mode or triangle partition mode as described above with regard to FIGS. 11 and 12. At 1520, it is determined that a second block of picture information spatially neighboring the first block was encoded based on an illumination compensation. Then, at 1530, encoding of the first block occurs based on the motion compensation mode and the illumination compensation.

Another example of an embodiment is shown in FIG. 16. In FIG. 16, at 1610 a motion compensation mode to encode a first block of picture information is determined. The motion compensation mode can include a sub-block based motion compensation prediction mode or a non-rectangular block partition mode. The non-rectangular block partition mode can be, for example, a GEO mode or triangle partition mode as described above with regard to FIGS. 11 and 12. At 1620, it is determined that a second block of picture information spatially neighboring the first block was decoded based on an illumination compensation. Then, at 1630, decoding of the first block occurs based on the motion compensation mode and the illumination compensation.

The embodiments described herein can be carried out by computer software implemented, e.g., by the processor 1010 of system 1000 in FIG. 3 or by hardware, or by a combination of hardware and software. As a non-limiting example, the embodiments can be implemented by one or more integrated circuits. The memory 1020 included in the example of a system 1000 shown in FIG. 3 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/ personal digital assistants ("PDAs"), and other devices that facilitate communication of information between end-users.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium, e.g., a non-transitory computer-readable medium.

Various embodiments have been described. Embodiments may include any of the following features or entities, alone or in any combination, across various different claim categories and types:

Providing in an encoder and/or decoder for Local Illumination Compensation (LIC) flag inference in case of sub-block temporal motion vector prediction and triangle partitions, both for the merge and classical inter modes.

Providing in an encoder and/or decoder for improving the derivation of LIC activation for sub-block-based temporal motion vector prediction (SbTMVP), and for triangle partitions by efficiently controlling LIC usage and LIC parameter computation.

Providing in an encoder and/or decoder for modifying the LIC flag propagation in merge mode and/or controlling the LIC flag signaling.

Providing in an encoder and/or decoder for, depending on the prediction and/or sub-partitioning of the current CU, inferring LIC based on more information than just the neighboring block's LIC flag.

Providing in an encoder and/or decoder for enabling LIC based on a spatial neighbor used for motion shift having LIC applied.

Providing in an encoder and/or decoder for enabling LIC based on evaluating a similarity criterion for a plurality of sub-block motion vectors, wherein the similarity criterion comprises the plurality of sub-block motion vectors satisfy a reference picture criterion, and the plurality of sub-block motion vectors satisfy a direction criterion, and the plurality of sub-block motion vectors satisfy a magnitude criterion.

Providing in an encoder and/or decoder involving enabling LIC based on evaluating a similarity criterion associated with a plurality of sub-block motion vectors, wherein the similarity criterion comprises a reference picture criterion based on the plurality of sub-block motion vectors all using the same reference picture or pictures, and a direction criterion based on the plurality of sub-block motion vectors all having the same direction with the same reference index or indices, and evaluating a magnitude criterion wherein the magnitude criterion comprises at least one of: a standard deviation of each component of the motion vectors, or a maximum value of the difference between the max and the min of each vector component of vectors vi (e.g., $\max(\max(v_i.x)-\min(v_i.x)$, $\max(\max(v_i.y)-\min(v_i.y))$, or an average difference between the first vector (in the scan order, i.e. top-left sub-block) and each sub-block vector (e.g.: average difference=sum(vi.x−v0.x+vi.y−V0.y)/(number of vectors)).

Providing in an encoder and/or decoder for processing video data comprising a coding unit having first and second prediction units each having a respective prediction unit index and wherein the first and second prediction units are formed based on a triangle partition of the coding unit, wherein the processing includes enabling a local illumination compensation based on a local illumination compensation parameter of a neighbor block of the coding unit and a split direction of the triangle partition and the prediction unit index.

Providing in an encoder and/or decoder for processing video data comprising a coding unit having first and second prediction units each having a respective prediction unit index and wherein the first and second prediction units are formed based on a triangle partition of the coding unit, wherein the processing includes enabling a local illumination compensation based on a local illumination compensation parameter of a neighbor block of the coding unit.

Providing in an encoder and/or decoder for processing video data comprising a coding unit having first and second prediction units each having a respective prediction unit index and wherein the first and second prediction units are formed based on a triangle partition of the coding unit, wherein the processing includes enabling a local illumination compensation based on a local illumination compensation parameter of a neighbor block of the coding unit and a split direction of the triangle partition and the prediction unit index, and wherein enabling the local illumination compensation is followed by determining at least one parameter of a local illumination compensation model and processing at least one prediction unit based on the local illumination compensation model and the at least one parameter.

Providing in an encoder and/or decoder for processing video data comprising a coding unit having first and second prediction units each having a respective prediction unit index and wherein the first and second prediction units are formed based on a triangle partition of the coding unit, wherein the processing includes enabling a local illumination compensation based on a local illumination compensation parameter of a neighbor block of the coding unit and a split direction of the triangle partition and the prediction unit index, and wherein enabling the local illumination compensation is followed by processing the first prediction unit to determine a first value of at least one parameter of a local illumination compensation model, processing the second prediction unit to determine a second value of the at least one parameter, and processing both the first and the second prediction units to apply the local illumination compensation based using the local illumination compensation model and a third value of the at least one parameter corresponding to an average of the first and second values.

Providing in an encoder and/or decoder for processing video data comprising a coding unit having first and second prediction units wherein the first and second prediction units are formed based on a triangle partition of the coding unit, wherein the processing includes determining a local illumination parameter based on the first prediction unit and enabling a local illumination compensation based on the local illumination compensation parameter and using the local illumination compensation parameter for applying local illumination compensation for both the first and the second prediction units.

Providing in an encoder and/or decoder for processing video data comprising a coding unit having first and second prediction units wherein the first and second prediction units are formed based on a triangle partition of the coding unit, wherein the processing includes determining a local illumination parameter based on the first prediction unit and enabling a local illumination compensation based on the local illumination compensation parameter and using the local illumination compensation parameter for applying local illumination compensation for the first prediction unit, wherein the local illumination compensation parameter is used to apply local illumination compensation for the second prediction unit if a motion characteristic of the second prediction unit satisfies a similarity criterion when compared to a motion characteristic of the first prediction unit, wherein the similarity criterion comprises a combination of having the same reference picture and a difference between each component of a plurality of motion vectors satisfying a difference criterion.

Providing in an encoder and/or decoder for processing video data comprising a coding unit having first and second prediction units wherein the first and second prediction units are formed based on a triangle partition of the coding unit, wherein the processing includes determining a local illumination parameter based on the first prediction unit and enabling a local illumination compensation based on the local illumination compensation parameter and using the local illumination compensation parameter for applying local illumination compensation for the first prediction unit, wherein the local illumination compensation parameter is used to apply local illumination compensation for the second prediction unit if a neighbor associated to the second prediction unit has local illumination compensation applied.

Providing in an encoder and/or decoder for processing video data based on temporal motion vector prediction comprising predicting a motion vector from a previously encoded frame, wherein the processing comprises determining a flag indicating whether to enable a local illumination compensation and the flag is inferred from a spatial neighbor.

Providing in an encoder and/or decoder for processing video data based on temporal motion vector prediction comprising predicting a motion vector from a previously encoded frame, wherein the processing comprises determining a flag indicating whether to enable a local illumination compensation and the flag is inferred based on more than one spatial neighbor have local illumination compensation enabled.

Providing in an encoder and/or decoder for processing video data based on temporal motion vector prediction comprising predicting a motion vector from a previously encoded frame, wherein the processing comprises determining a flag indicating whether to enable a local illumination compensation and the flag is inferred from a spatial neighbor based on the spatial neighbor having local illumination compensation enabled and a motion characteristic of a current prediction unit satisfies a similarity criterion compared to a motion characteristic of the spatial neighbor motion, wherein the similarity criterion comprises having the same reference and satisfying a difference criterion.

Providing an encoder and/or decoder for processing video in accordance with any of the embodiments, features or entities, alone or in any combination, as described herein based on providing reduced complexity and/or improved compression efficiency.

Inserting in the signaling syntax elements that enable the encoder and/or decoder to provide encoding and/or decoding in accordance with any of the embodiments, features or entities, alone or in any combination, as described herein.

Selecting, based on these syntax elements, the features or entities, alone or in any combination, as described herein to apply at the decoder.

A bitstream or signal that includes one or more of the described syntax elements, or variations thereof Inserting in the signaling syntax elements that enable the decoder to provide decoding in a manner corresponding to the manner of encoding used by an encoder.

Creating and/or transmitting and/or receiving and/or decoding a bitstream or signal that includes one or more of the described syntax elements, or variations thereof A TV, set-top box, cell phone, tablet, or other electronic device that provides for applying encoding and/or decoding according to any of the embodiments, features or entities, alone or in any combination, as described herein.

A TV, set-top box, cell phone, tablet, or other electronic device that performs encoding and/or decoding according to any of the embodiments, features or entities, alone or in any combination, as described herein, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs encoding and/or decoding according to any of the embodiments, features or entities, alone or in any combination, as described herein.

A TV, set-top box, cell phone, tablet, or other electronic device that receives (e.g. using an antenna) a signal over the air that includes an encoded image, and performs encoding and/or decoding according to any of the embodiments, features or entities, alone or in any combination, as described herein.

A computer program product storing program code that, when executed by a computer encoding and/or decoding in accordance with any of the embodiments, features or entities, alone or in any combination, as described herein.

A non-transitory computer readable medium including executable program instructions causing a computer executing the instructions to implement encoding and/or decoding in accordance with any of the embodiments, features or entities, alone or in any combination, as described herein.

Various other generalized, as well as particularized embodiments are also supported and contemplated throughout this disclosure.

The invention claimed is:

1. A method for a video decoder, the method comprising:
determining that a sub-block based motion compensation mode is used for a first block of picture information;
enabling illumination compensation for decoding the first block based on a plurality of motion vectors associated with respective ones of a plurality of sub-blocks of the first block of picture information meeting a similarity criterion, wherein the similarity criterion comprises at least the plurality of motion vectors having a magnitude relationship that comprises a standard deviation of each component of the plurality of motion vectors being less than a value;
determining that a second block of picture information spatially neighboring the first block is decoded based on an illumination compensation; and
based on determining that the second block of picture information spatially neighboring the first block was decoded based on the illumination compensation, decoding the first block based on the sub-block based motion compensation mode and the illumination compensation.

2. A method for a video encoder, the method comprising:
determining that a sub-block based motion compensation mode is used for a first block of picture information;
enabling illumination compensation for encoding the first block based on a plurality of motion vectors associated with respective ones of a plurality of sub-blocks of the first block of picture information meeting a similarity criterion, wherein the similarity criterion comprises at least the plurality of motion vectors having a magnitude relationship that comprises a standard deviation of each component of the plurality of motion vectors being less than a value;
determining that a second block of picture information spatially neighboring the first block is encoded based on an illumination compensation; and based on determining that the second block of picture information spatially neighboring the first block was encoded based on the illumination compensation, encoding the first block based on the sub-block based motion compensation mode and the illumination compensation.

3. A video decoding device comprising:

a processor configured to:

determine that a sub-block based motion compensation mode is used for a first block of picture information;

enable illumination compensation for decoding the first block based on a plurality of motion vectors associated with respective ones of a plurality of sub-blocks of the first block of picture information meeting a similarity criterion, wherein the similarity criterion comprises at least the plurality of motion vectors having a magnitude relationship that comprises a standard deviation of each component of the plurality of motion vectors being less than a value;

determine that a second block of picture information spatially neighboring the first block is decoded based on an illumination compensation; and based on determining that the second block of picture information spatially neighboring the first block was decoded based on the illumination compensation, decode the first block based on the sub-block based motion compensation mode and the illumination compensation.

4. A video encoding device comprising:

a processor configured to:

determine that a sub-block based motion compensation mode is used for a first block of picture information;

enable illumination compensation for encoding the first block based on a plurality of motion vectors associated with respective ones of a plurality of sub-blocks of the first block of picture information meeting a similarity criterion, wherein the similarity criterion comprises at least the plurality of motion vectors having a magnitude relationship that comprises a standard deviation of each component of the plurality of motion vectors being less than a value;

determine that a second block of picture information spatially neighboring the first block was encoded based on an illumination compensation; and based on determining that the second block of picture information spatially neighboring the first block was encoded based on the illumination compensation, encode the first block based on the sub-block based motion compensation mode and the illumination compensation.

5. The method of claim 1, wherein the sub-block based motion compensation mode comprises a sub-block based temporal motion vector prediction mode.

6. The method of claim 1, wherein the plurality of sub-blocks comprises the sub-blocks of the first block of picture information and the plurality of motion vectors comprises the motion vectors of the sub-blocks of the first block of picture information.

7. The method of claim 1, wherein the similarity criterion further comprises at least one of:

the plurality of motion vectors having the same reference picture or reference pictures; or the plurality of motion vectors having the same direction.

8. The method of claim 7, wherein the plurality of motion vectors having the same direction comprises any of the plurality of motion vectors being unidirectional with the same reference index or being bidirectional with the same reference indices.

9. The method of claim 1, wherein the value comprises five samples.

10. The method of claim 1, wherein the similarity criterion comprises a maximum value of a difference between a maximum and a minimum of each vector component of each of the plurality of motion vectors.

11. The method of claim 10, wherein the maximum value of the difference between the maximum and the minimum of each vector component of each of the plurality of motion vectors comprises a greater difference among a difference for an x-component for each of the plurality of motion vectors and a difference for a y-component for each of the plurality of motion vectors.

12. The method of claim 1, wherein the similarity criterion comprises an average difference between a first motion vector in a scan order and each sub-block motion vector.

13. The method of claim 12, wherein the average difference between the first motion vector in the scan order and each sub-block motion vector comprises an average of a sum of x-component differences between each sub-block motion vector and the first motion vector and y-component differences between each sub-block motion vector and the first motion vector.

14. The method of claim 13, wherein the first motion vector in the scan order is associated with a top-left sub-block.

15. The device of claim 3, wherein the plurality of sub-blocks comprises the sub-blocks of the first block of picture information and the plurality of motion vectors comprises the motion vectors of the sub-blocks of the first block of picture information.

16. The device of claim 3, wherein the similarity criterion further comprises at least one of:

the plurality of motion vectors having the same reference picture or reference pictures; or the plurality of motion vectors having the same direction.

17. The device of claim 16, wherein the plurality of motion vectors having the same direction comprises any of the plurality of motion vectors being unidirectional with the same reference index or being bidirectional with the same reference indices.

18. The device of claim 3, wherein the value comprises five samples.

19. The device of claim 3, wherein the similarity criterion comprises a maximum value of a difference between a maximum and a minimum of each vector component of each of the plurality of motion vectors.

20. The device of claim 19, wherein the maximum value of the difference between the maximum and the minimum of each vector component of each of the plurality of motion vectors comprises a greater difference among a difference for an x-component for each of the plurality of motion vectors and a difference for a y-component for each of the plurality of motion vectors.

21. The device of claim 3, wherein the similarity criterion comprises an average difference between a first motion vector in a scan order and each sub-block motion vector.

22. The device of claim 21, wherein the average difference between the first motion vector in the scan order and each sub-block motion vector comprises an average of a sum of x-component differences between each sub-block motion vector and the first motion vector and y-component differences between each sub-block motion vector and the first motion vector.

23. The device of claim 22, wherein the first motion vector in the scan order is associated with a top-left sub-block.

\* \* \* \* \*